US012776208B2

(12) United States Patent
Wang et al.

(10) Patent No.: US 12,776,208 B2
(45) Date of Patent: Oct. 27, 2026

(54) ARTIFICIAL INTELLIGENCE CLOSED LOOP CONTROL FOR TRAFFIC SIGNALS OF MULTIPLE INTERSECTIONS

(71) Applicants: UT-Battelle, LLC, Oak Ridge, TN (US); University of Hawaii, Honolulu, HI (US)

(72) Inventors: Hong Wang, Oak Ridge, TN (US); Guohui Zhang, Honolulu, HI (US); Chieh Wang, Oak Ridge, TN (US); Yunli Shao, Oak Ridge, TN (US); Wan Li, Oak Ridge, TN (US); Arun Athiban, Honolulu, HI (US); Jinghui Yuan, Oak Ridge, TN (US)

(73) Assignees: UT-BATTELLE, LLC, Oak Ridge, TN (US); University of Hawaii, Honolulu, HI (US)

( * ) Notice: Subject to any disclaimer, the term of this patent is extended or adjusted under 35 U.S.C. 154(b) by 182 days.

(21) Appl. No.: 18/819,850

(22) Filed: Aug. 29, 2024

(65) Prior Publication Data

US 2025/0078655 A1 Mar. 6, 2025

Related U.S. Application Data

(60) Provisional application No. 63/535,330, filed on Aug. 30, 2023.

(51) Int. Cl.

*G08G 1/08* (2006.01)
*G06N 3/044* (2023.01)
*G08G 1/01* (2006.01)

(52) U.S. Cl.

CPC ............... *G08G 1/08* (2013.01); *G06N 3/044* (2023.01); *G08G 1/0129* (2013.01); *G08G 1/0133* (2013.01); *G08G 1/0145* (2013.01)

(58) Field of Classification Search

CPC ...... G08G 1/08; G08G 1/0129; G08G 1/0133; G08G 1/0145; G08G 1/081; G06N 3/044
See application file for complete search history.

(56) References Cited

U.S. PATENT DOCUMENTS

2024/0363006 A1* 10/2024 Liu .......................... G08G 1/08

FOREIGN PATENT DOCUMENTS

CN 112863179 A * 5/2021 ............. G06N 3/044

OTHER PUBLICATIONS

Y. Bengio, P. Simard, and P. Frasconi, "Learning longterm dependencies with gradient descent is difficult," IEEE transactions on neural networks, vol. 5, No. 2, pp. 157-166, 1994.

(Continued)

*Primary Examiner* — Davetta W Goins
*Assistant Examiner* — Sharmin Akhter
(74) *Attorney, Agent, or Firm* — Fox Rothschild LLP

(57) ABSTRACT

Systems and methods for controlling traffic flow along an arterial. The systems comprise a data processing apparatus configured to: monitor traffic light control signals (TLCSs) used to control traffic lights at intersection(s) and traffic delays occurring at intersection(s) at a time when the traffic lights are being controlled by TLCSs; access a hybrid model comprising a first linear term corresponding to an instance of traffic delays, a second linear term corresponding to a concurrent instance of TLCSs, and a nonlinear function defining a nonlinear relationship between the instance of the traffic delays and a previous instance of TLCSs; use the hybrid module to predict traffic delays at intersection(s) based on the traffic control signals and the traffic delays; determine, based on TLCSs and the traffic delays, traffic control signals that cause the predicted traffic delays to decrease; and cause the traffic lights to be controlled using the traffic control signals.

19 Claims, 29 Drawing Sheets

(56) References Cited

OTHER PUBLICATIONS

C. Chen, H. Wei, N. Xu, G. Zheng, M. Yang, Y. Xiong, K. Xu, and Z. Li, "Toward a thousand lights: Decentralized deep reinforcement learning for largescale traffic signal control," in Proceedings of the AAAI Conference on Artificial Intelligence, vol. 34, pp. 3414-3421, 2020.

Z. Cui, K. Henrickson, R. Ke, and Y. Wang, "Traffic graph convolutional recurrent neural network: A deep learning framework for network scale traffic learning and forecasting," IEEE Transactions on Intelligent Transportation Systems, vol. 21, No. 11, pp. 4883-4894, 2019.

J. Guo, W. Huang, and B. M. Williams, "Adaptive Kalman filter approach for stochastic short-term traffic flow rate prediction and uncertainty quantification," Transportation Research Part C: Emerging Technologies, vol. 43, pp. 50-64, 2014.

S. Hochreiter and J. Schmidhuber, "Long short-term memory," Neural computation, vol. 9, No. 8, pp. 1735-1780, 1997.

R. Ke, W. Li, Z. Cui, and Y. Wang, "Two stream multichannel convolutional neural network for multilane traffic speed prediction considering traffic volume impact," Transportation Research Record, vol. 2674, No. 4, pp. 459-470, 2020.

W. Li, C. Wang, Y. Shao, H. Wang, Z. Guohui, T. Ma, J. Ringler, and D. Chou, "Hybrid neural network modeling for multiple intersections along signalized arterials current situation and some new results," in Vehicular 2021, The Tenth International Conference on Advances in Vehicular Systems, Technologies and Applications, pp. 10-20, 2021.

W. Li, J. Wang, R. Fan, Y. Zhang, Q. Guo, C. Siddique, and X. J. Ban, "Short-term traffic state prediction from latent structures: Accuracy vs. efficiency," Transportation Research Part C: Emerging Technologies, vol. 111, pp. 72-90, 2020.

D. Srinivasan, M. C. Choy, and R. L. Cheu, "Neural networks for real-time traffic signal control," IEEE Transactions on intelligent transportation systems, vol. 7, No. 3, pp. 261-272, 2006.

C. Thornton, F. Hutter, H. H. Hoos, and K. LeytonBrown, "Autoweka: Combined selection and hyperparameter optimization of classification algorithms," in Proceedings of the 19th ACM SIGKDD international conference on Knowledge discovery and data mining, pp. 847-855, 2013.

B. M. Williams, P. K. Durvasula, and D. E. Brown, "Urban freeway traffic flow prediction: application of seasonal autoregressive integrated moving average and exponential smoothing models," Transportation Research Record, vol. 1644, No. 1, pp. 132-141, 1998.

H. Wang, M. Zhu, W. Hong, C. Wang, G. Tao, and Y. Wang, "Optimizing signal timing control for large urban traffic networks using an adaptive linear quadratic regulator control strategy," IEEE Transactions on Intelligent Transportation Systems, vol. 23, No. 1, pp. 333-343, 2022.

H. Wang, S. V. Patil, H. A. Aziz, and S. Young, "Modeling and control using stochastic distribution control theory for intersection traffic flow," IEEE Transactions on Intelligent Transportation Systems, vol. 23, No. 3, pp. 1885-1898, 2022.

H. Wei, G. Zheng, V. Gayah, and Z. Li, "Recent advances in reinforcement learning for traffic signal control: A survey of models and evaluation," ACM SIGKDD Explorations Newsletter, vol. 22, No. 2, pp. 12-18, 2021.

H. Yuan and G. Li, "A survey of traffic prediction: from spatiotemporal data to intelligent transportation," Data Science and Engineering, vol. 6, No. 1, pp. 63-85, 2021.

* cited by examiner

A signalized arterial in Honolulu with 34 intersections as indicated by green circles. Considered ontersections are indicated by red rectangle.

Hybrid recurrent neural network (HRNN) architecture.

(Training Error)

(Training Error PDF)

(Testing Error)

(Training Error PDF)

(a) Phase 1: Westbound left-turning movement.

(b) Phase 2: Eastbound through movement.

(c) Phase 4: Northbound through and left-turning movements.

(c) Phase 6: Westbound through movement.
Delay comparisons for training data at intersection1.

(a) Phase 1: Westbound left-turning movement.

(b) Phase 2: Eastbound through movement.

(c) Phase 4: Northbound through and left-turning movements.

(d) Phase 6: Westbound through movement.
Delay comparisons for testing data at intersection1.

Comparison of Mean Absolute Percentage Error - the use of Vissim data (red) vs. read system data (blue).

| Timestamp | Event Code | Event Param | |
|---|---|---|---|
| 2/1/2021 11:27:30 | 44 | 1 | |
| 2/1/2021 11:27:31 | 7 | 1 | |
| 2/1/2021 11:27:31 | 8 | 1 | |
| 2/1/2021 11:27:31 | 63 | 13 | |
| 2/1/2021 11:27:33 | 81 | 36 | |
| 2/1/2021 11:27:33 | 44 | 5 | |
| 2/1/2021 11:27:30 | 82 | 34 | Detector on, Detector id 37 |
| 2/1/2021 11:27:31 | 7 | 5 | Green off, phase 5 |
| 2/1/2021 11:27:31 | 8 | 5 | Yellow on, phase 5 |
| 2/1/2021 11:27:31 | 63 | 15 | |
| 2/1/2021 11:27:33 | 81 | 37 | Detector off, Detector id 37 |
| 2/1/2021 11:27:35 | 10 | 1 | Red clearance on, phase 1 |
| 2/1/2021 11:27:35 | 9 | 1 | |
| 2/1/2021 11:27:35 | 64 | 13 | |
| 2/1/2021 11:27:35 | 65 | 13 | |
| 2/1/2021 11:27:36 | 0 | 2 | |
| 2/1/2021 11:27:36 | 11 | 1 | Red clearance off, phase 1 |
| 2/1/2021 11:27:36 | 1 | 2 | Green on, phase 2 |
| 2/1/2021 11:27:36 | 2 | 6 | |
| 2/1/2021 11:27:36 | 12 | 1 | |
| 2/1/2021 11:27:36 | 21 | 2 | |
| 2/1/2021 11:27:37 | 10 | 5 | Red clearance on, phase 5 |
| 2/1/2021 11:27:37 | 9 | 5 | |
| 2/1/2021 11:27:37 | 64 | 15 | |
| 2/1/2021 11:27:37 | 65 | 15 | |
| 2/1/2021 11:27:38 | 0 | 6 | |
| 2/1/2021 11:27:38 | 11 | 5 | Red clearance off, phase 5 |
| 2/1/2021 11:27:38 | 1 | 6 | Green on, phase 6 |
| 2/1/2021 11:27:38 | 12 | 5 | |

Excerpt of raw high-resolution event data.

FIG. 15

Handling missing data.

Illustration of delay calculation.

Recurrent Neural Network (RNN) architecture.

Comparison of MAPE (%) along with error bars for different modeling frameworks.

Comparison of MAPE (%) along with error bars for different modeling frameworks.

Comparison of MAPE (%) along with error bars for different modeling frameworks.

Comparison of MAPE (%) along with error bars for different modeling frameworks.

ARTIFICIAL INTELLIGENCE CLOSED LOOP CONTROL FOR TRAFFIC SIGNALS OF MULTIPLE INTERSECTIONS

CROSS-REFERENCE TO RELATED APPLICATION(S)

The present application claims priority to and the benefit of U.S. Provisional Patent Application No. 63/535,330 which was filed on Aug. 30, 2023. The content of this Provisional Patent Application is incorporated herein by reference in its entirety.

STATEMENT REGARDING FEDERALLY SPONSORED RESEARCH AND DEVELOPMENT

The technologies described herein were developed with government support under Contract No. DE-AC05-00OR22725 awarded by the U.S. Department of Energy. The government has certain rights in the described technologies.

BACKGROUND

Description of the Related Art

In parallel with artificial neural network and AI development since 1958, significant research on AI modeling and controls for networked traffic system are reported in the literature. Most studies only consider a few intersections, and large-scale field testing has not been reported because of the lack of comprehensive real-time data and user-friendly interfaces to the implementation. These shortcomings have limited the current research on AI for mobility at the simulation level.

SUMMARY

The present disclosure concerns a system for controlling traffic flow along an arterial. The system comprises a data processing apparatus configured to: monitor traffic light control signals used to control traffic lights at one or more intersections of the arterial and traffic delays occurring at the one or more intersections at a time when the traffic lights are being controlled by the traffic light control signals; access a hybrid model comprising a first linear term corresponding to an instance of the traffic delays, a second linear term corresponding to a concurrent instance of the traffic light control signals, and a nonlinear function defining a nonlinear relationship between the instance of the traffic delays and a previous instance of the traffic light control signals; use the hybrid module to predict traffic delays at the one or more intersections based on the traffic control signals and the traffic delays; determine, based on the traffic light control signals and the traffic delays, traffic control signals that cause the predicted traffic delays to decrease; and cause the traffic lights to be controlled using the traffic control signals that were determined.

The present document also concerns a non-transitory computer-readable medium that stores instructions that is configured to, when executed by at least one computing device, cause the at least one computing device to perform operations comprising: monitoring traffic light control signals used to control traffic lights at one or more intersections of the arterial and traffic delays occurring at the one or more intersections at a time when the traffic lights are being controlled by the traffic light control signals; accessing a hybrid model comprising a first linear term corresponding to an instance of the traffic delays, a second linear term corresponding to a concurrent instance of the traffic light control signals, and a nonlinear function defining a nonlinear relationship between the instance of the traffic delays and a previous instance of the traffic light control signals; using the hybrid module to predict traffic delays at the one or more intersections based on the traffic control signals and the traffic delays; determining, based on the traffic light control signals and the traffic delays, traffic control signals that cause the predicted traffic delays to decrease; and causing the traffic lights to be controlled using the traffic control signals that were determined.

BRIEF DESCRIPTION OF THE DRAWINGS

The present solution will be described with reference to the following drawing figures, in which like numerals represent like items throughout the figures.

FIG. 15 shows an excerpt of raw event data.

DETAILED DESCRIPTION

Figure 1:
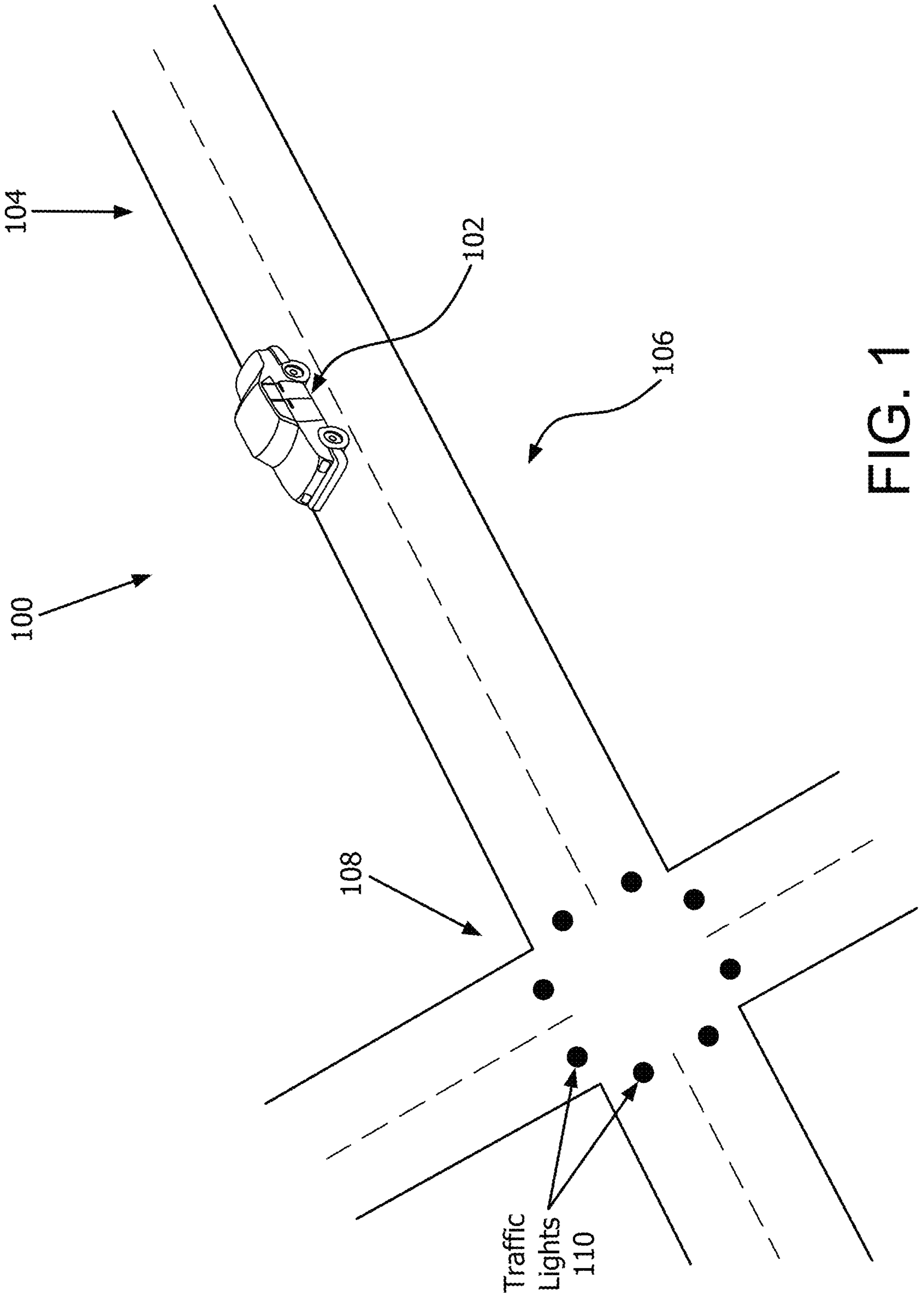
FIG. 1 provides illustrations of an environment with a road on which vehicle(s) travel.

The above-mentioned shortcomings of conventional solutions have limited the current research on AI for mobility at the simulation level. Energy efficiency has not been well addressed for these AI-based modeling and controls. This causes the following challenges and technical barriers (1)-(3). (1) Although the theory of AI-based modeling and control for signal control is maturing, the field testing and closed-loop control implementation for large number of intersections is still limited because of the insufficient real-time data for fast feedback control realization. (2) The existing AI-based modeling for transportation systems cannot yet capture the nonlinear and dynamic stochastic nature with high reliability and robustness. (3) Control performance for the energy minimization is still lacking. Technologies that address these challenges (1)-(3) in particular, the real-world implementation for AI-based approaches are needed to demonstrate their true effects rather than simply performing simulations.

The present solution generally concerns implementing systems and methods for AI-based closed-loop coordinated signal control for intersections. Control of traffic flow along arterials requires signal timing control at intersections so that the resulting traffic flows along the arterials are as smooth as possible with minimized energy usage. With advances in sensing technologies, various data sets are available, allowing effective data-driven modeling to be conducted for further controller design that produces better signal timing control at intersections. Herein, a hybrid neural network (HNN) is described to model the multiple intersections along a signalized arterial in a city, for which the modeling structure and relevant training algorithms have been developed. The disclosed HNN includes linear dynamics and a nonlinear function. The linear dynamics present a simplified opportunity for the closed-loop control design. The nonlinear function is a representation of unmodeled dynamics as a function of previously available system inputs and outputs. The modeling and training may be performed simultaneously for linear dynamics matrices and the weights of neural networks that approximate the nonlinear dynamics of the system. A preliminarily calibrated VISSIM microscopic traffic simulation platform is described to learn the real system using HNN modeling in which data collected from VISSIM simulations are used to estimate the system's unknown features. The modeling results using real data and VISSIM-generated data are compared, and the desired modeling results are obtained.

The present solution has been applied to AI-based modeling and signal coordination controls for the Nimitz Highway and Ala Moana Boulevard arterial in Honolulu, Hawaii. It was shown that the present solution can achieve at least 15% energy savings and 25% reduction in travel delay. The present solution can be implemented as control systems for improved traffic flow with a system-level operational and data access platform.

More specifically, AI-based modeling and control based on real-time data was used to construct an AI-based closed-loop coordinated signal control systems for 34 intersections. The present solution addressed the following aspects: (a) established nonlinear dynamic stochastic models that reflect the real-world traffic flows and energy consumption using AI techniques and deep learning approaches; (b) implemented AI control for the traffic flow system with minimized energy usage for 34 intersections in the arterial system in Honolulu that led to real-time AI-based closed-loop coordinated signal control for the arterial; and (c) conducted on-site testing and validation for the modeling and control algorithm in (a) and (b).

AI-Based Modeling

The nature of a traffic flow system in networked signal timing-controlled intersections can be represented as a dynamic and stochastic system in which the input to this system is the traffic demand and the signal timing at each intersection, and the output is the traffic flow status (e.g., travel delays, queue length, and traffic flow speed, and energy consumed when the vehicles pass through this arterial). Because the traffic demand and traffic flows (e.g., number of vehicles and their compositions) are random, the system is both stochastic and multi-input and multi-output (MIMO). To optimize the traffic flow and minimize energy consumption, a MIMO dynamic model should be established that characterizes the relationship between these inputs and outputs. The data available for the establishment of a neural network-based AI-model include, but are not limited to: data group 1 associated with all signal control status parameters along arterials; data group 2 associated with CCTV-based video detection (e.g., volumes, occupancy, queue length, etc.); data group 3 associated with arterial performance measurements (e.g., arterial travel time, control delays, and/or number of stops); data group 4 associated with V2X communication and customized connected vehicle trajectories; and/or data group 5 associated with real-time advanced traveler information system.

Because first-principles modeling is difficult to obtain, AI-based modeling using high-resolution event-based data from roadside sensors, similar to the ones installed by ECONOLITE® along the Nimitz Highway, were used to obtain effective models with adaptive learning capabilities. In this context, the use of modeling error entropy or its probability density function (PDF) was considered as the modeling cost functions to be minimized to obtain reliable and robust modeling effect ready for the control algorithm development and implementation.

The present solution includes creating a traffic microsimulation software (e.g., VISSIM)-based digital twin of the Nimitz arterial. Two AI dynamics models were trained, one on the high-resolution event-based data and the other on simulated data from the digital twin. The two AI dynamic models were checked to make sure that they are similar before proceeding to the control algorithm development.

AI-Based Closed-Loop Control Design

Following the establishment of reliable and robust AI-based dynamic models that characterizes the dynamic relationship between signal timing plan and travel demand (i.e., the inputs), and traffic flow conditions such as travel delays and queue length (i.e., the outputs), a MIMO AI-based controller design was carried out. To reiterate, the inputs to the model are the signal timing and travel demand, while the outputs are the traffic flow conditions such as travel delays, queue length and number of stops. In this context, the purpose of the coordinated signal control along the arterial is to produce collaborative signal timing of the 34 intersections in a closed-loop feedback way, so that the traffic flow is made as smooth as possible with minimized energy consumption. This forms a typical multi-objective stochastic optimization using AI-based approaches as a learning mechanism in a feedback loop.

The control algorithm was tuned independently on the ECONOLITE® and VISSIM-digital twin models. When the tuning on the two models had converged, the disclosed coordinated signal control was deployed experimentally.

Real-World Testing and Implementation

Once the modeling and control was obtained and validated, real-time implementation was carried out for the closed-loop system. This included establishing the interface with the ECONOLITE® information system and conducting comprehensive testing scenarios to show the benefits of AI-based controls for improved mobility with reduced energy consumption. It was shown that the closed-loop system achieved at least 15% energy savings and 25% reduction in travel delay.

In summary, the hybrid neural network modeling and AI control described herein can model and control the signal timing plans for multiple intersections along a corridor. The solution obtained can be applied to a wider range of traffic flow conditions and therefore presents a new way to realize smooth traffic flow with minimized energy consumption.

The present solution provides a novel way to achieve reliable 24/7 real-time implementation of AI-based modeling and control for a large intersectional arterial and enable a unique benchmark for transportation control. The present solution can realize smooth traffic flow with minimized energy consumption.

FIG. 1 provides an illustration of an environment 100 including a road 104 on which vehicle(s) 102 travel. Road 104 may be an arterial road and/or have one or more intersections 108. Because the number of vehicles on a section 106 of the road 104 may be random during any time duration, the nature of a traffic flow system in signalized arterials can be represented as a dynamic and stochastic system.

Figure 2:
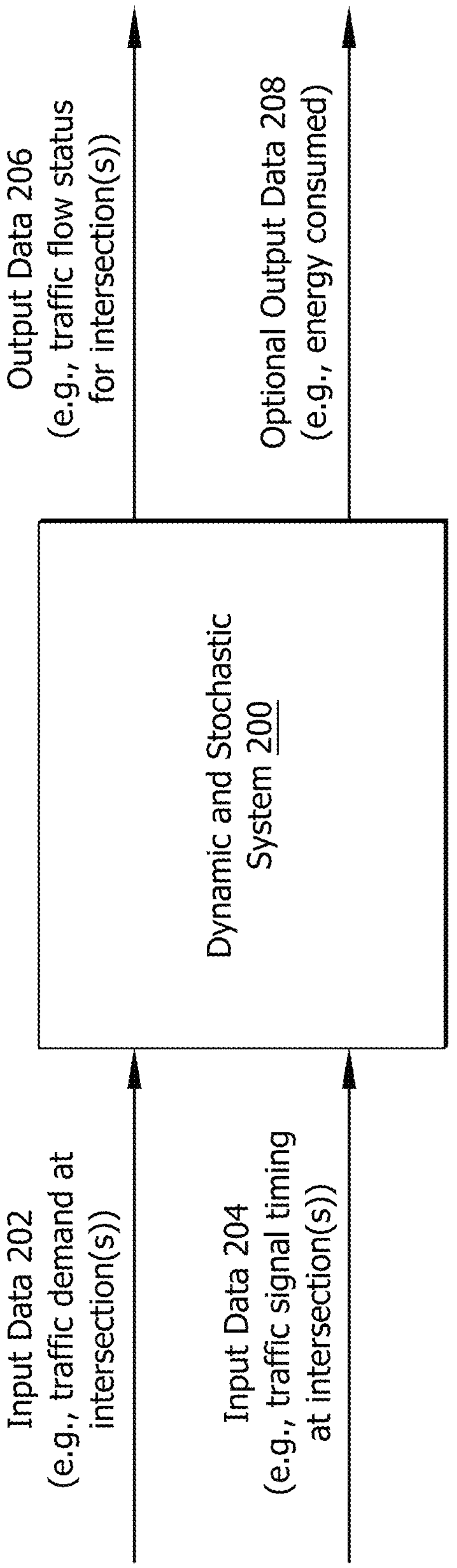
FIG. 2 provides an illustration of a dynamic and stochastic system.

An illustration of the dynamic and stochastic system is provided in FIG. 2. As shown in FIG. 2, data 202, 204 is input into the dynamic and stochastic system 200. Input data 202 include, but is not limited to, the traffic demand at each intersection of a plurality of given intersections. Input data 204 includes, but is not limited to, traffic signal timing at each intersection of a plurality of given intersections. System 200 performs operations to generate output data 206. Output data 206 can include, but is not limited to, the traffic flow status for each intersection of the plurality of given intersections. The traffic flow status may be described in terms of, for example, travel delays, queue length, and/or traffic flow speed. Other output data 208 can include, but is not limited to, the energy consumed when vehicle(s) pass through a given intersection and/or road 104. The consumed energy can be defined in terms of gasoline usage and/or electricity usage.

System 200 is a multi-input and multi-output (MIMO) stochastic dynamic system, and the objective of system 200 is to control signal timing at intersections so that the resulting traffic flows along the roads 104 are as smooth as possible with minimized energy usage. If the system 200 is represented in the continuous time domain, the present solution can be obtained using partial differential equations induced from Ito stochastic differential equations with random boundary conditions. The present solution for such a complicated model is quite difficult to obtain, and the model should frequently solved using high-performance computing, which generally cannot be used for real-time control design and implementation. Therefore, data-driven modeling methods—in particular, those widely used in artificial intelligence (AI) technology are effective ways to establish dynamic models between signal control and traffic flows so that system performance can be controlled and optimized in real time. The advantage of using AI-based models is that these models can be adaptively learned using evolving real-time data. Therefore, the use of neural network modeling has been a subject of study for many years.

On the other hand, advances in wireless-driven vehicular communications have greatly facilitated modeling exercises, and emerging cooperative intelligent transportation control system operations have enabled many smart traffic control and management applications to improve traffic safety and operational efficiency. Vehicle-to-everything communications allow vehicles to communicate with other vehicles; infrastructure; pedestrians, bicyclists, and devices; and internet through cellular networks and/or dedicated short-range communication technologies. The information exchanges supported by vehicle-to-everything communication systems can be used to effectively balance traffic demand distribution among traffic networks and facilitate traffic flow progression. With the new data available in a real-time format, AI-based modeling, and ultimately control, can be further enhanced to optimally coordinate signal controls for traffic flow systems along arterials.

Traffic system modeling aims to establish linear or nonlinear mathematical relationships between traffic states—such as traffic volume, travel time, control delay, and signal timing plan—given spatiotemporal traffic information. Most studies leverage a single data source. For example, one objective is to predict near-term traffic flow given historical traffic flow data. Other studies use multiple data sources to capture dominant dependencies between different features. For example, a model was developed in literature to predict lane-based traffic speed using traffic volume data. In general, transportation system modeling techniques can be divided into non-learning-based and learning-based methods. For example, classical non-learning-based methods include autoregressive integrated moving average and K-nearest neighbors. These models are usually more interpretable but cannot capture the spatial correlations of traffic states. Moreover, they are not appropriate for nonstationary data. Traditional learning-based methods include regression, Kalman filter, and support vector machine. These methods are generally more effective than non-learning-based models, but they usually fail to capture the nonlinear spatiotemporal correlations of traffic data. Increasingly more data sources and computational power are available, so more advanced learning-based methods (e.g., different types of neural networks) have shown promising performance. The most commonly used neural networks for transportation system modeling include artificial neural networks, long short-term memory, convolutional neural networks, and graph-based neural networks. Compared with artificial neural networks, convolutional neural networks and long short-term memory have advantages in capturing nonlinear spatial and temporal dependencies of traffic features. However, they are not suited for large transportation networks. In this context, graph-based neural networks are powerful tools for large-scale traffic signal control systems. Graph-based neural networks can extract features from graph-structured data and predict future traffic states in an efficient and effective manner. With the established dynamic stochastic models for transportation systems, the next step is to develop real-time optimal control strategies to reduce travel delays and energy consumption. Conventional traffic control methods for multiple intersections in a network, such as SCOOT, GreenWave, SOTL, max-pressure, and SCATS, usually assume simplified traffic conditions with complete traffic information available (e.g., predefined traffic flows and driving behaviors). Hence, they are not applicable for real-world traffic control for multiple intersections in terms of achieving smooth traffic flows with minimized energy consumption.

Recently, reinforcement learning (RL) models have been studied extensively and have made impressive progress in traffic control domains. For example, model-free RL can be categorized as value-based and policy-based methods. A deep neural network has been set up in literature to learn the Q-function of decentralized reinforced learning from the sampled traffic states (inputs) and the corresponding traffic conditions (outputs). Motivated by max pressure control, an RL approach was developed in literature for large-scale road networks. Although decentralized reinforced learning models improve traffic signal control in complex transportation systems, they treat neighboring intersections as the same and fail to model the spatial dependencies of traffic flows.

In addition, for stochastic modeling of traffic flow systems, one important criterion is the reliability of and confidence in the obtained models for control and optimization. Thus, the models need to be built using real-time input and output data, and they need to be reliable and have a high level of confidence for users. In this context, the use of modeling error entropy, or its probability density function (PDF), should be considered as the modeling objective function to be minimized. Ideally, a narrowly distributed modeling error PDF centered at zero mean would indicate that the models obtained have high reliability and confidence intervals. This PDF is exactly the models' novelty compared with existing AI-based models for transportation systems, in which only sum of squares error has been used to judge whether the obtained model is accurate. The method of using modeling error entropy and PDF to perform online adaptive learning was established several years ago, and this approach can be applied in combination with the existing AI modeling tools to establish reliable and robust AI-based models for traffic flow systems.

Based upon this analysis, the following challenges remain in terms of AI-based modeling and control for signalized intersections along arterials and the urban grid road network.

- Although the theory of AI-based modeling and control for signal control is maturing, field testing and closed-loop control implementation for many intersections is still limited because of insufficient real-time data for fast feedback control realization.
- The existing AI-based modeling for transportation systems cannot yet capture the nonlinear and dynamic stochastic nature with high reliability and robustness.
- Guaranteed control performance for control delay and energy minimization is still lacking.

In data-driven approaches, the following issues need to be studied.

- Data-driven modeling requires a good set of data in a real-time framework.
- In terms of control strategies, the control model should be structured to be easily implemented in real-time. An affine type of dynamic model would be one option. This affine structure will be described in the following sections.
- Most studies have focused on simulations, and real-time 24/7 implementation is lacking.

These challenges constitute research questions to be answered. Herein, a modeling strategy is described for control of multiple signalized intersections. The modeling strategy comprises a hybrid neural network (HNN) modeling strategy. Neural network modeling is described herein for signalized intersections along an arterial in Honolulu using the real-time data from the system. The present solution is not limited in this regard. An HNN model, which is a subset of neural networks, was constructed, and its learning algorithm with a convergency guarantee was established. A comprehensive assessment of the modeling effort was conducted using gradient approaches.

In addition, modeling was performed using historical real system data. Note that, in early testing of the control design using such obtained models, the real system was not utilized. Therefore, a microscopic traffic simulation platform that mimics the actual systems was required, upon which comprehensive modeling and control testing was conducted. A simulation platform was developed by comparing the modeling results using the simulation-generated data. Indeed, if the modeling results using simulation platform-generated data are like the modeling results using the real system data (e.g., the historical data), then the simulation platform is consistent with the real system dynamics. Thus, a traffic microsimulation using software such as VISSIM was performed. The disclosed technology can rely on the HNN modeling using a simulation-generated data stream.

Traffic Flow System Description and VISSIM Simulation platform

Figure 3:
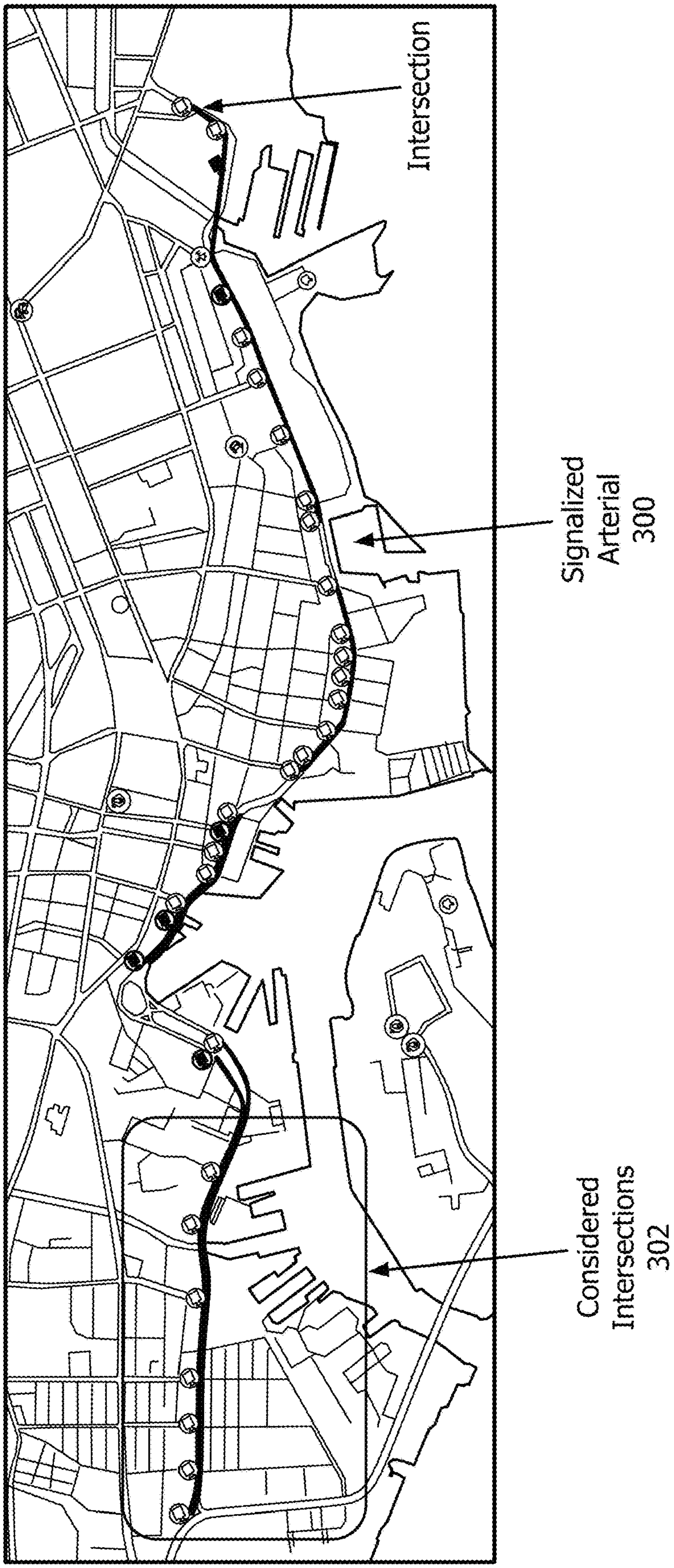
FIG. 3 provides an illustration of a map showing a road with intersections.

This section describes the system structure and the construction of the microsimulation platform. With reference to FIG. 3, an illustration is provided that shows the signalized arterials to be modeled and learned, where 34 intersections are controlled by signal timing plans at these intersections. The purpose of the present solution is to use the obtained model to establish controlled signal timing plans so that the traffic flow along the corridor is made as smooth as possible, fulfilling the global objective of smoothing traffic flows with minimized energy usage. For such a system, the input is the signal timing plan at each intersection, and the output is the traffic flow characteristics (e.g., delays) of different phases (e.g., left turns, right turns, and/or through movements).

To obtain such a control strategy, the dynamics of the system should be understood in terms of how signal timing plans would affect traffic flows (e.g., travel delays). This understanding requires a comprehensive modeling effort to be made and thus it is described next. The objective is to develop dynamic models that reflect the dynamics of the system.

Taking u(k) as an input (e.g., a signal timing plan that provides the duration of green, yellow, and red lights in a fixed cycle length) and y(k) as an output vector representing the traffic flow characteristics (e.g., delays) for each phase (i.e., through movements, left turns, and/or right turns) at an intersection, the dynamics of the system can be generally modeled as shown by mathematical equation (1).

$$y(k+1) = f(y(k), u(k), w(k)) \tag{1}$$

where $f(\ldots)$ is a nonlinear vector function representing the system dynamics, w(k) represents a random noise term, and k represents a sample number. The sample number may be a multiplication of cycle duration in signal timing control. For example, assuming that the cycle length is one hundred seconds and the system is sampled every two cycles, then the changes of k from i to j(i<j) covers the time interval of length 2×100×(j−i) seconds.

A traffic microsimulation system was established to represent the original system shown in FIG. 3 with regular calibration using the real system data. Assuming that a simulation is well calibrated using the real system data from FIG. 3, simulations on the model-based controller design can be readily performed using such a platform. For this purpose, a VISSIM simulation platform shown in FIG. 4 was established.

Figure 4:
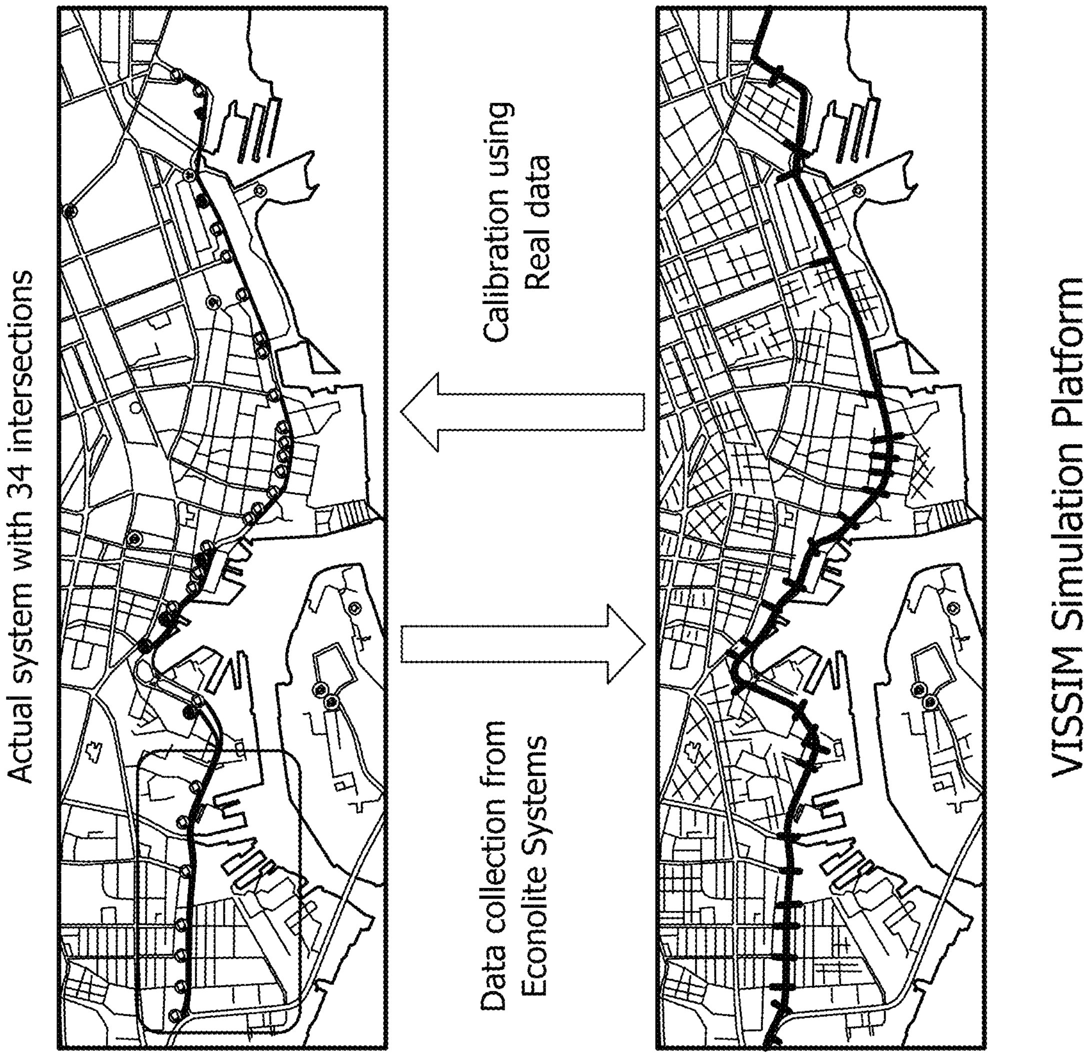
FIG. 4 provides an illustration that facilitates an understanding of a simulation platform.
Figure 5:
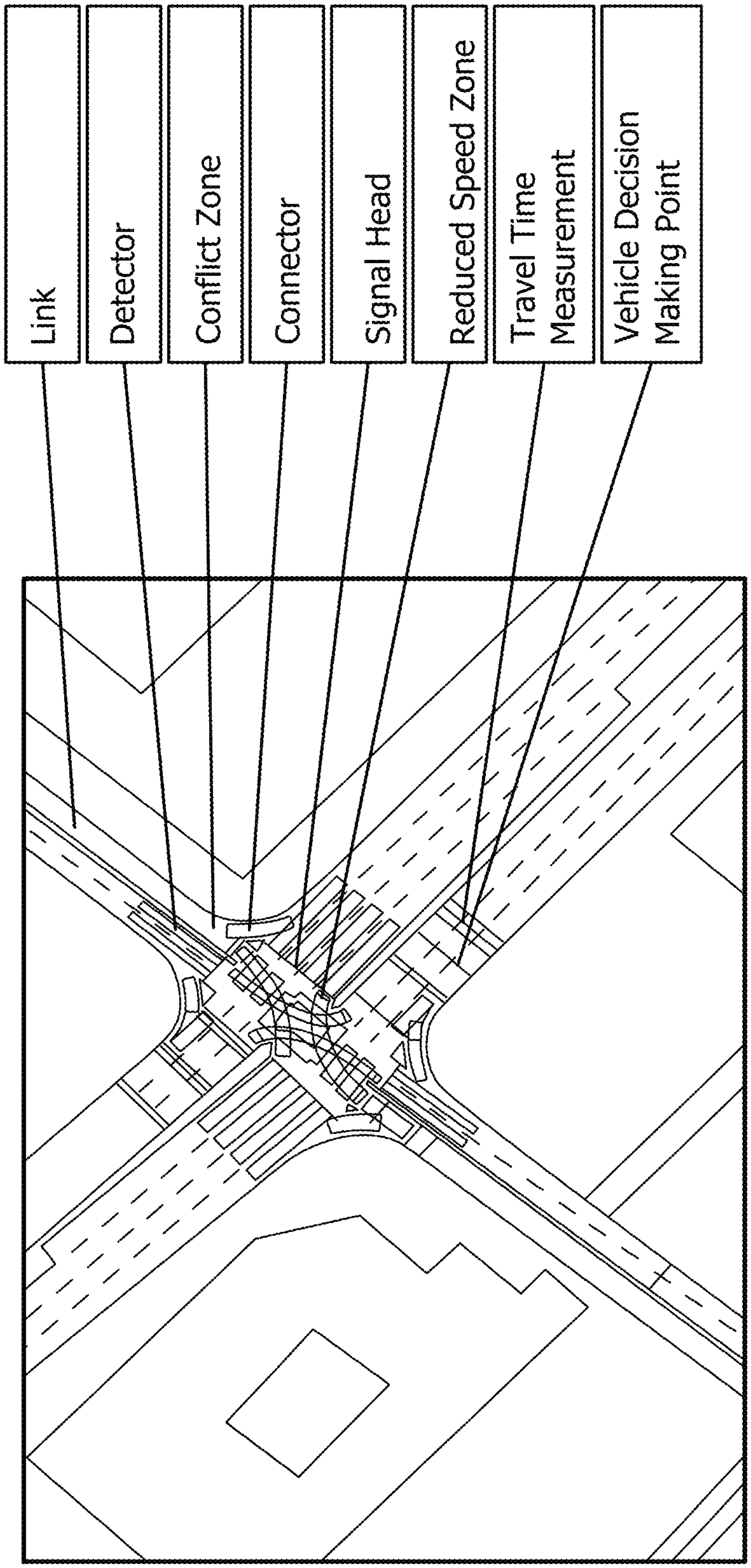
FIG. 5 provides an illustration of a simulated intersection.

Herein, PTV VISSIM (a microscopic software for traffic simulation and signal controls) was used to facilitate the development and testing of different traffic signal control methods. For the system shown in FIG. 3, the VISSIM simulation platform was constructed as shown in FIG. 4. For this system, VISSIM used Wiedemann car-following and lane-changing models to model the movements and interactions of vehicles. The VISSIM traffic model shown in FIG. 4 was developed based on actual road geometries of the study area. This microscopic simulation model has been pre-calibrated by actual traffic data of the system. The real-world data include high-resolution data obtained from the signal controllers and traffic sensors (e.g., cameras) installed at each intersection. The timing plan, actual green light time, and cycle lengths of each intersection are available. The sensors can include, but are not limited to, advanced, stop-bar, and pulse detectors that record all vehicle arrival, departure, and stop events at each phase of each intersection. These detectors provide detailed vehicle volume and turning movement data. In addition, raw camera video feeds were obtained to determine vehicle compositions and microscopic vehicle behaviors. These data were directly fed into the VISSIM simulation as inputs to adjust parameters, including signal timing plan, vehicle inputs, vehicle compositions, speed distributions, conflict areas, priority rules, reduced speed areas, and car-following and lane-change behaviors. The VISSIM-simulated traffic performance metrics (such as vehicle delay, travel time, and travel speed) were compared against the real-world performance to further fine-tune the simulation. This enhancement ensures that the simulation was consistent with the traffic characteristics of the real world.

Such a VISSIM simulation platform can be regarded as a digital twin, which is a parallel digital system linked to the actual system through data transmission between them. FIG. 4 provides a closer look of a small set of intersections in the VISSIM simulation platform. Real system data from March 2-Apr. 2, 2021 was used to calibrate the models in VISSIM.

Once the VISSIM simulation is calibrated to accurately represent the original system, the data from it can be used to learn the system dynamics, and the learned model can facilitate the design of an adaptive learning control strategy. Such an approach allows comprehensive simulation testing for obtaining closed-loop control before it is applied to the real system. Once closed-loop system simulation is desired, the modeling and control functionalities using VISSIM data can be directly switched onto the real system by allowing the modeling and control units to accept real system data. This approach applies the real-time implementation of the obtained modeling and control strategy. Thus, traffic microsimulation using VISSIM or similar software is a key stage in the modeling and implementable control design for actual traffic flow systems.

For the modeling purpose, the following operations were performed: (i) establish an effective data-driven modeling and learning algorithm for the system; (ii) use data from the simulation platform to train the model; and (iii) compare the simulation-trained model with the model learned from the real system data to ensure that the VISSIM simulation produces results consistent with the results from the real system.

HNN Using VISSIM Simulation Data

This section describes the HNN modeling structure and training algorithm, as well as the convergence requirements for the training algorithm. Because the system is unknown, nonlinear, and non-Gaussian, data-driven modeling (e.g., neural networks and fuzzy logic) can be a well-suited choice. For this purpose, an HNN modeling approach was developed, and a dynamic model was considered that reflects the relationship between the input and the output in mathematical equation (1). Moreover, to improve the model, traffic volume was also considered as an extra input. Thus, the system had two input vectors 202, 204 (e.g., traffic volume or demand, and signal timing or time plan) and one output vector 206 (e.g., traffic delays). The system model was therefore assumed as follows:

$$y(k+1) = Ay(k) + Bu(k) + f(y(k),\ u(k-1),\ v(k)), \tag{2}$$

where y(k) denotes an average delay per vehicle, and u(k) denotes a green light time for multiple intersections at time index k. $f(\ldots)$ is an unknown nonlinear vector function to be learned, and v(k) is noise. {A, B} are the weight matrices to be identified simultaneously with the estimate for the unknown nonlinear dynamics.

Let a neural network be used to approximate $f(y(k), u(k-1), v(k))$ by $\hat{f}(y(k), u(k-1), v(k), \pi)$, where v(k) denotes traffic volume, and π groups all neural network weights and biases. Then, the neural network and the two matrices were trained to obtain accurate and reliable models for the traffic flow system. In this case, seven intersections 302 of an arterial 300 were considered as shown in FIG. 3. The objective of training was to minimize the following performance function:

$$\min_{\pi} J = \frac{1}{2}(\hat{y}(k+1) - y(k+1))^2, \tag{3}$$

which is a minimum variance error criterion, where it has been defined that $$\hat{y}(k+1) = Ay(k) + Bu(k) + \hat{f}(y(k),\ u(k-1),\ v(k),\ \pi) \tag{4}$$

and {A, B, π} are parameters to be trained. In mathematical equation (4), vectors $\hat{y}(k)$ and $\hat{f}(\ldots)$ are the estimates of $\hat{y}(k)$ and $\hat{f}(\ldots)$, respectively, using the collected data from VISSIM simulation platform.

Gradient Rule for Training

Using gradient optimization, the following recursive estimation and training algorithm can be readily obtained to read $$\hat{A}(k+1) = \hat{A}(k) - \lambda_1 \frac{\partial J}{\partial A}\Big|_{(\hat{A}(k),\hat{B}(k),\hat{\pi}(k))}, \tag{5}$$

$$\hat{B}(k+1) = \hat{B}(k) - \lambda_2 \frac{\partial J}{\partial B}\Big|_{(\hat{A}(k),\hat{B}(k),\hat{\pi}(k))}, \text{ and} \tag{6}$$

$$\hat{\pi}(k+1) = \hat{\pi}(k) - \lambda_3 \frac{\partial J}{\partial \pi}\Big|_{(\hat{A}(k),\hat{B}(k),\hat{\pi}(k))} \tag{7}$$

where $\lambda_1$, $\mu_2$ and $\lambda_3$ are prespecified positive learning rates that are typically selected to be less than 1.0, and the gradients are calculated from $$\frac{\partial J}{\partial A}\Big|_{(\hat{A}(k),\hat{B}(k),\hat{\pi}(k))} = (\hat{y}(k+1) = y(k+1))\frac{\partial \hat{y}}{\partial A}\Big|_{(\hat{A}(k),\hat{B}(k),\hat{\pi}(k))} = (\hat{y}(k+1) - y(k+1))y(k) \tag{8}$$

-continued $$\frac{\partial J}{\partial B}\Big|_{\left(\hat{A}(k),\hat{B}(k),\hat{\pi}(k)\right)} = (\hat{y}(k+1) = y(k+1))\frac{\partial \hat{y}}{\partial B}\Big|_{\left(\hat{A}(k),\hat{B}(k),\hat{\pi}(k)\right)} = (\hat{y}(k+1) - y(k+1))u(k) \tag{9}$$

$$\frac{\partial J}{\partial \pi}\Big|_{\left(\hat{A}(k),\hat{B}(k),\hat{\pi}(k)\right)} = (\hat{y}(k+1) = y(k+1))\frac{\partial \hat{f}}{\partial \pi}\Big|_{\left(\hat{A}(k),\hat{B}(k),\hat{\pi}(k)\right)} \tag{10}$$

where y(k+1) is the data from the VISSIM simulation platform in the same way as the data used for the input.

Convergency Consideration

The selections of the learning rates are also critical to ensure a good balance between the responsiveness of the learning and its stability in providing convergent neural network training. Using the second-order derivative analysis such as Jacobean matrices, one can obtain the ranges for these learning rates.

Denoting φ[A, B, π], the local optimal effect would require the following to be satisfied:

$$\frac{\partial^2 I}{\partial \varphi^2} > 0 \tag{11}$$

with the following guarantee:

$$\lim_{k\to+\infty} (\hat{y}(k) - y(k))^2 = 0 \tag{12}$$

These two conditions ensure that the modeling objective function in mathematical equation (3) monotonically decreases around the local minimum point, namely $$J(k+1) - J(k) \approx -\tilde{\varphi}^T \frac{\partial^2 J}{\partial \varphi^2}\tilde{\varphi} \le 0 \tag{13}$$

where $\tilde{\varphi}$=φ(k)−φ*, and φ* represents a group of matrices and weights that ensure a local minimum of mathematical equation (3). Therefore, mathematical equation (11) is calculated along with the progress of training mathematical equations (5)-(7) to ensure that the learning is at least locally convergent—leading to a Gaussian-like PDF for the modeling errors. This is an additional computational load required during the learning phase described in mathematical equations (5)-(7). By summarizing the learning represented in mathematical equations (5)-(7) in a compact form, mathematical equation (14) is obtained.

$$\varphi(k+1) = \varphi(k) - \lambda\frac{\partial J}{\partial \varphi} \tag{14}$$

Then, the condition of mathematical equation (11) means that one needs to select the learning rate λ>0 so that $$0 < \lambda < \frac{2}{\lambda_{max}(\Gamma^T\Gamma)} \tag{15}$$

where Γ is an information matrix composed of all the past inputs and outputs used in the training, $\lambda_{max}$ denotes the maximum eigenvalue of matrix $\Gamma^T\Gamma$, and λ denotes any of the three learning rates in mathematical equations (5)-(7). In practice, once the learning rates are selected to be sufficiently small, the convergency guarantee can be generally realized.

For example, one can consider the following B-spline neural network to approximate the nonlinear function ƒ( . . . ) in mathematical equation (2). This leads to the following model representation:

$$\hat{y}(k+1) = Ay(k) + Bu(k) + \sum_{i=1}^{n} w_i B_i(z(k)) \tag{16}$$

$$z(k) = [y(k), u(k-1), v(k)]^T$$

where $w_i$ (i=1, 2, . . . , n) are the neural network weight vectors to be trained using the VISSIM system data from z(k), and $B_i$(z(k)) are a set of prespecified basis functions defined on the functional space of z(k). Then, mathematical equation (16) can be expressed as $$\hat{y}(k+1) = \Gamma(k)\pi \tag{17}$$

where the information matrix can be expressed as $$\Gamma(k) = [y(k), u(k), B_1(z(k)), B_2(z(k)), \ldots, B_n(z(k))] \tag{18}$$

Therefore, the objective function in Eq. (3) can be expressed as $$J = \frac{1}{2}\|y(k+1) - \Gamma(k)\pi\|^2 \tag{19}$$

In this case, the gradient training in mathematical equation (14) can still be applied, which gives the convergence guarantee as shown in mathematical equation (15).

The training algorithm described in mathematical equations (5)-(10) provides a set of simultaneous estimates for both linear parameters and neural network weights. Also, because the control input u(k) to be designed is linearly involved in the model, the controller design using AI techniques can be easily implemented as a direct inverse calculation so long as the matrix B is of a full column rank. This approach effectively facilitates real-time implementation for the whole system.

Data and Processing from VISSIM Simulation

To model the system in mathematical equation (2), relevant data from the seven intersections in the VISSIM simulation platform were collected along the arterial as shown in FIG. 4. The details of the data collected are summarized in the TABLE I.

TABLE 1

| DATA COLLECTION FOR HNN MODELING | |
|---|---|
| Study area | Intersections 1-7 |
| Dates collected | March 2-Apr. 2, 2021 |
| Time duration | 4 p.m.-7 p.m. |

TABLE 1-continued

| DATA COLLECTION FOR HNN MODELING | |
|---|---|
| Signal timing | All phases of major and minor streets |
| Traffic volume | All movements |
| Traffic delay | All movements |
| Sampling index | Every two signal cycles (each cycle ~180 s) |

Modeling Results of HNN Using Simulation Data

Figure 6:
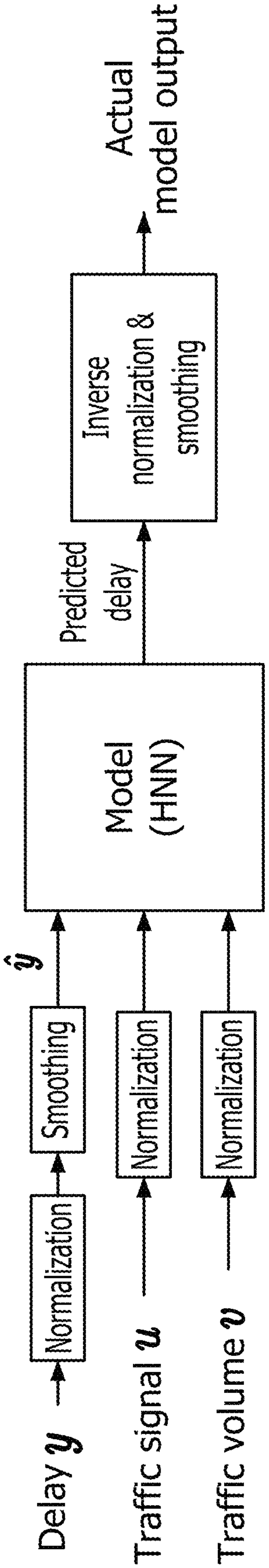
FIG. 6 provides an illustration of data preprocessing operations.

This section describes the modeling results. Before the HNN model was trained, the raw data from the VISSIM simulation platform were preprocessed to remove or reduce noise in the data, as shown in FIG. 4. For traffic signal and traffic volume data, normalization was conducted to scale data between zero and one. For traffic delay data, after normalization, simple exponential smoothing was applied to further filter the data to remove noise, as shown in mathematical equation (20), where l(k) is the filtered delay, y(k) is the normalized delay, and α is the smoothing factor between zero and one. As α decreases, the observation of delay at k has a reduced effect on the output 1(*k*), indicating that the randomness of the delay measurements is reduced. After training of the HNN model, inverse normalization and inverse smoothing were applied to generate actual model output. This process is shown in FIG. 6.

$$l(k) = \alpha y(k) + (1 - \alpha) l(k - 1) \tag{20}$$

Figure 7:
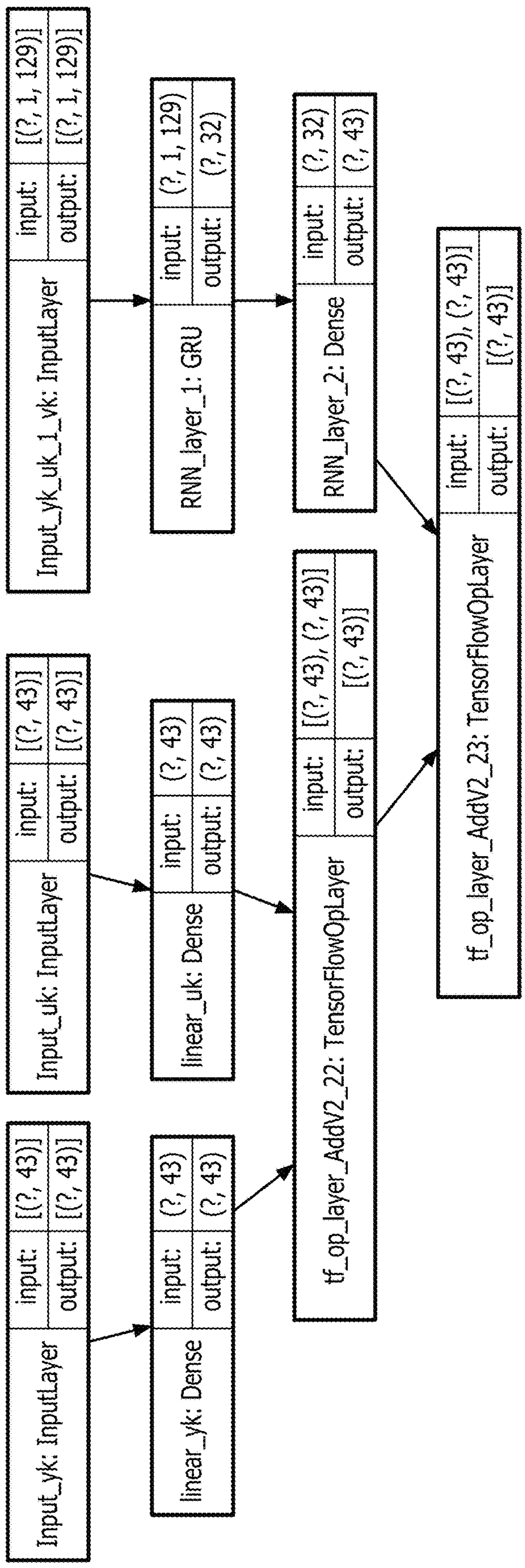
FIG. 7 provides an illustration of a hybrid neural network model.

The HNN model was trained by 80% of the total data points and was tested with the remaining 20% of total data. FIG. 7 illustrates the HNN model structure applied herein when simulation-generated data were used.

Simulation Data Based HNN Modeling Effect

The modeling results were evaluated by mean absolute percentage error (MAPE), root mean square error (RMSE), and mean absolute error (MAE) as described in Eqs. (21)-(23), respectively, where $y_n$(k) is the true delay at time k of phase n, and $\hat{y}_n$(k) is the predicted delay at time k of phase n.

$$MAPE = \frac{1}{NK}\sum_{k=1}^{K}\sum_{n=1}^{N}\left|\frac{y_n(k) - \hat{y}_n(k)}{y_n(k)}\right| \tag{21}$$

$$RMSE = \frac{1}{NK}\sum_{k=1}^{K}\sum_{n=1}^{N}\sqrt{(y_n(k) - \hat{y}_n(k))^2} \tag{22}$$

$$MAE = \frac{1}{NK}\sum_{k=1}^{K}\sum_{n=1N}|y_n(k) - \hat{y}_n(k)| \tag{23}$$

TABLE II and TABLE III show the prediction results for all phases of all seven intersections, the phases of main streets and side streets, and the phase of each intersection. Note that delay prediction at main streets is more accurate than at side streets. The reason is that traffic volumes at side streets are much lower and more stochastic compared with main streets.

TABLE II

TRAINING AND TESTING RESULTS

| | Training (all) | Testing (all) | Testing (main streets) | Testing (side streets |
|---|---|---|---|---|
| MAPE | 6.2% | 6.3% | 5.7% | 6.5% |
| RMSE | 8.5 s | 8.4 s | 1.9 s | 10.3 s |
| MAE | 5.6 s | 5.7 s | 1.5 s | 8.1 s |

TABLE III

TESTING RESULTS AT EACH INTERSECTION

| Intersection | 1 | 2 | 3 | 4 | 5 | 6 | 7 |
|---|---|---|---|---|---|---|---|
| MAPE (%) | 4.7 | 7.0 | 6.6 | 6.7 | 6.5 | 7.1 | 4.7 |
| RMSE (s) | 5.3 | 7.8 | 7.5 | 10.0 | 9.0 | 8.6 | 8.0 |
| MAE (s) | 3.8 | 5.4 | 5.2 | 7.2 | 6.1 | 5.6 | 5.7 |

Figure 8:
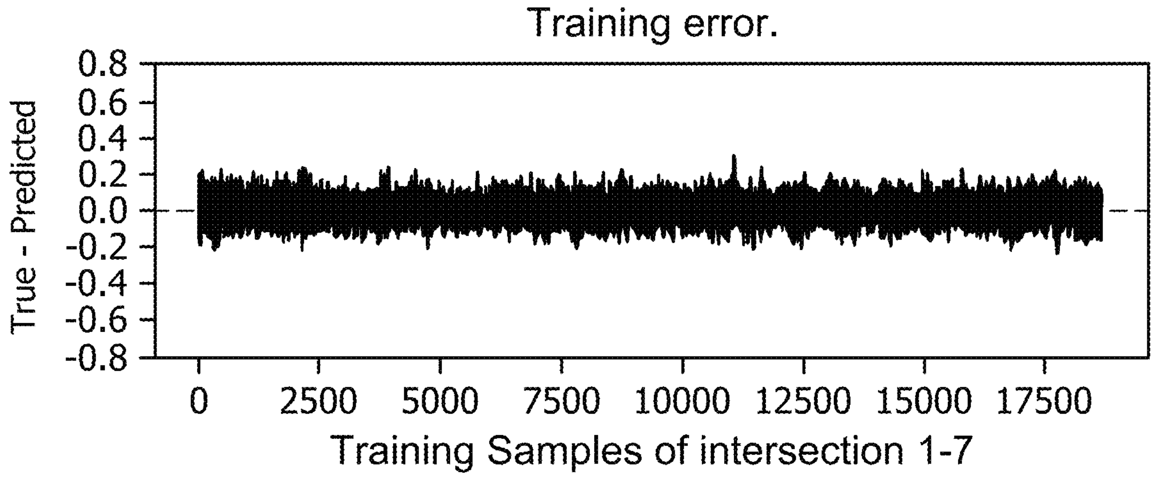
FIG. 8 provides a graph showing a training error.
Figure 9:
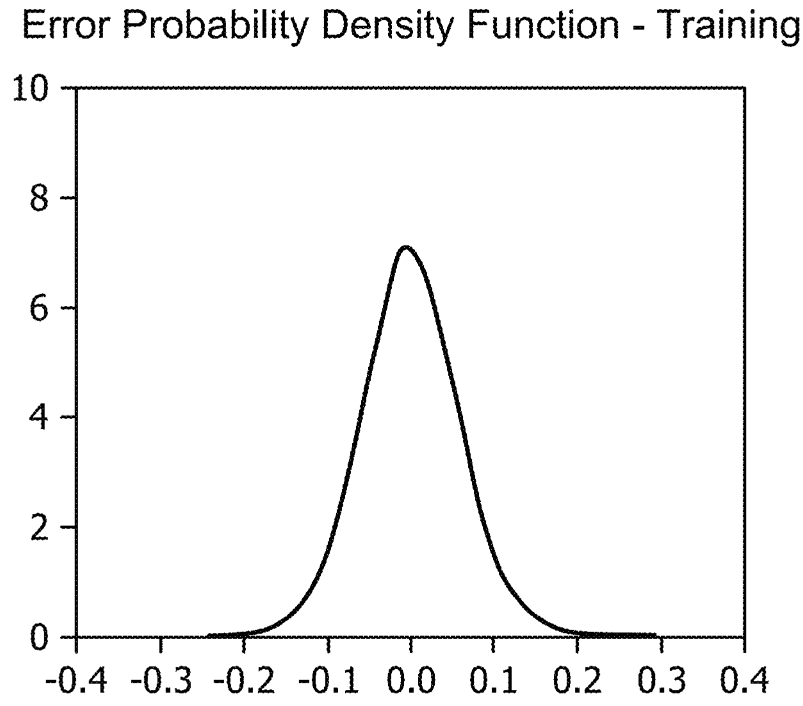
FIG. 9 provides a graph showing a training error probability density function (PDF).

FIGS. 8-9 show the error and the distribution represented by the PDF of training errors. Training errors are roughly symmetrically distributed along the horizontal axis.

Figure 10:
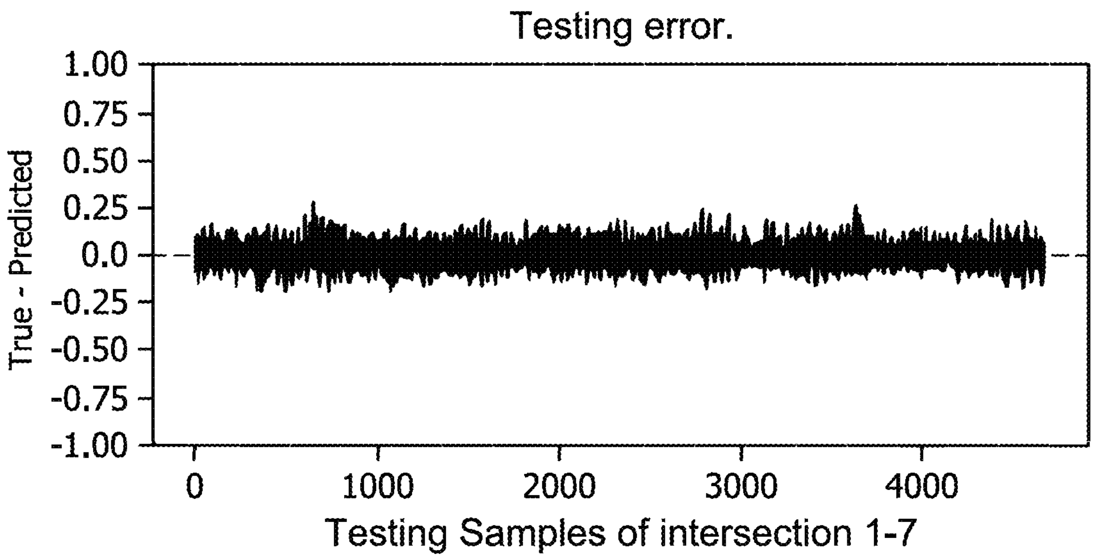
FIG. 10 provides a graph showing a testing error.
Figure 11:
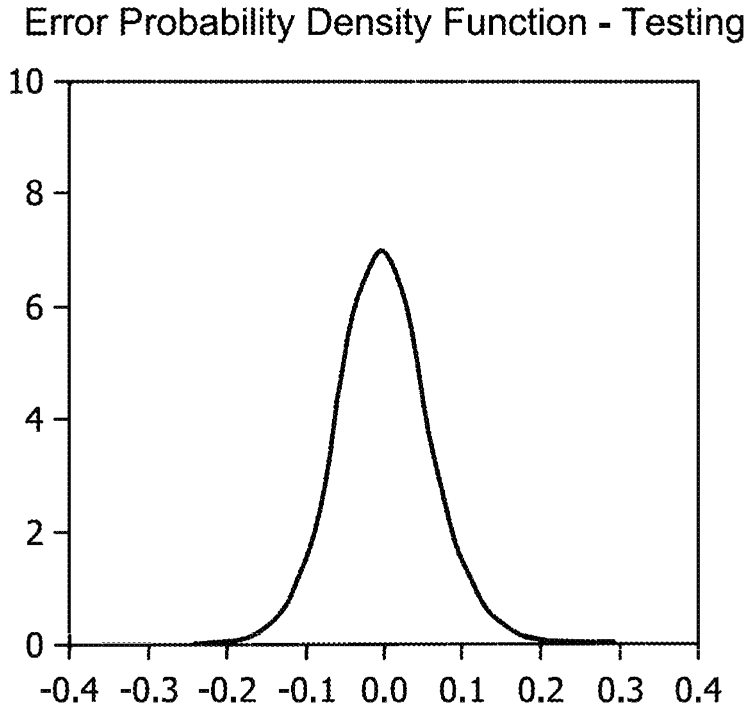
FIG. 11 provides a graph showing a testing error PDF.
Figure 12A:
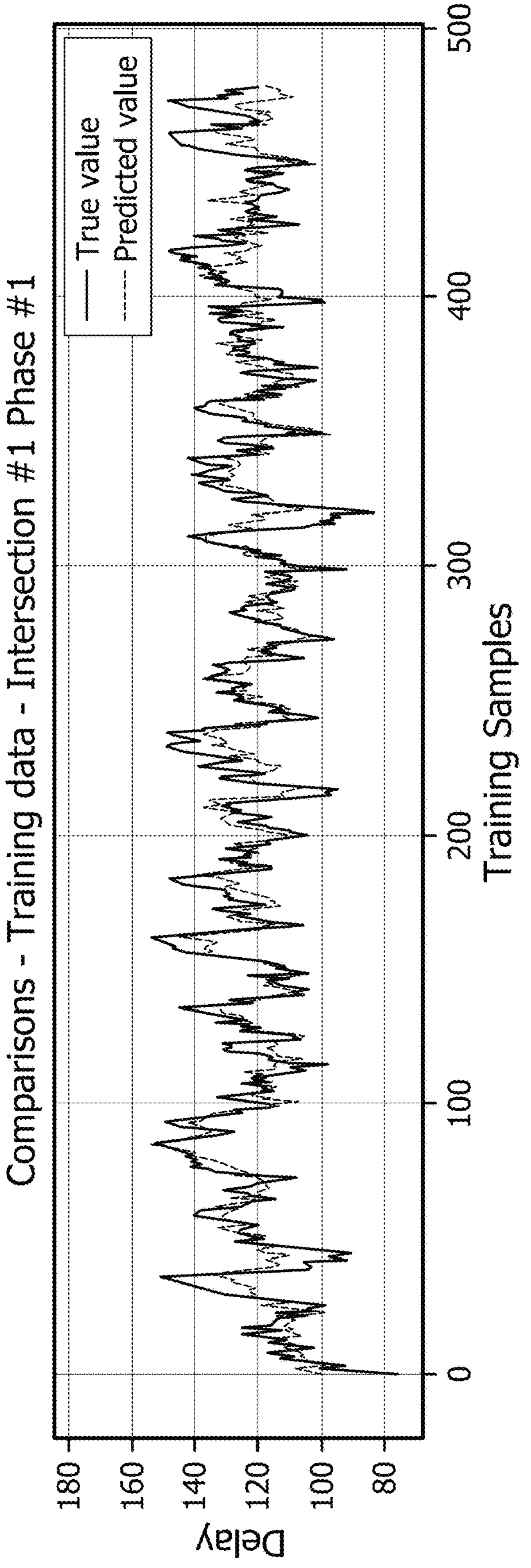
FIGS. 12(*a*)-12(*d*) (collectively referred to as "FIG. 12") provide graphs showing delay comparisons for training data at an intersection.
Figure 12B:
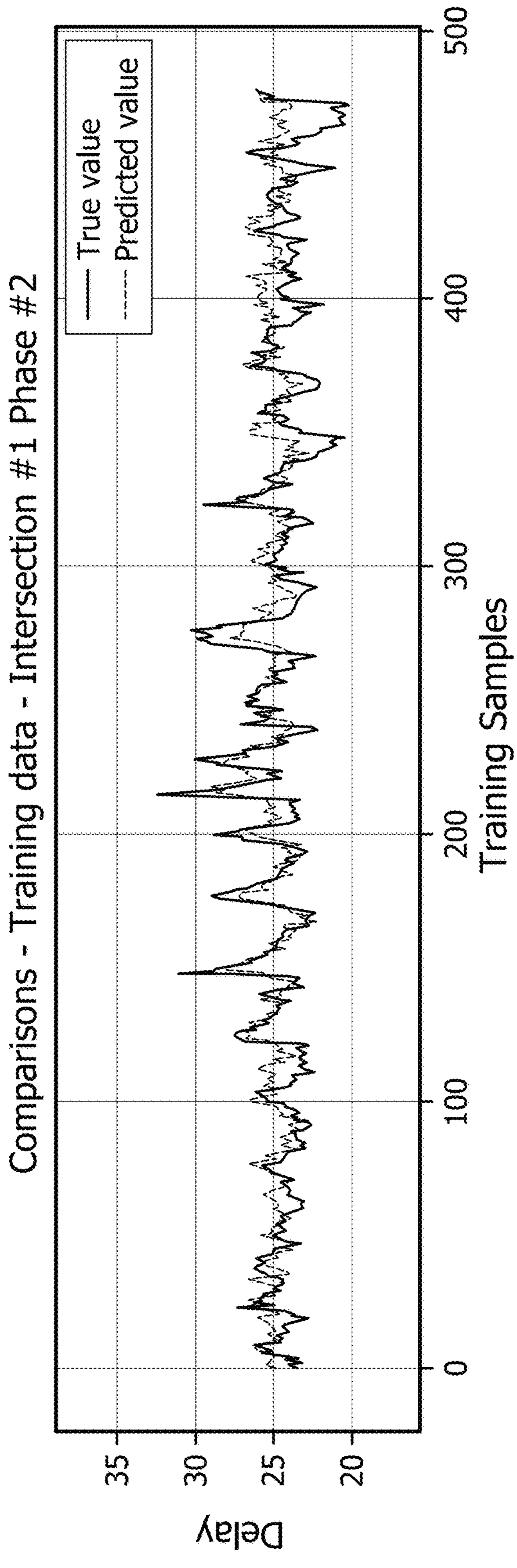
Figure 12C:
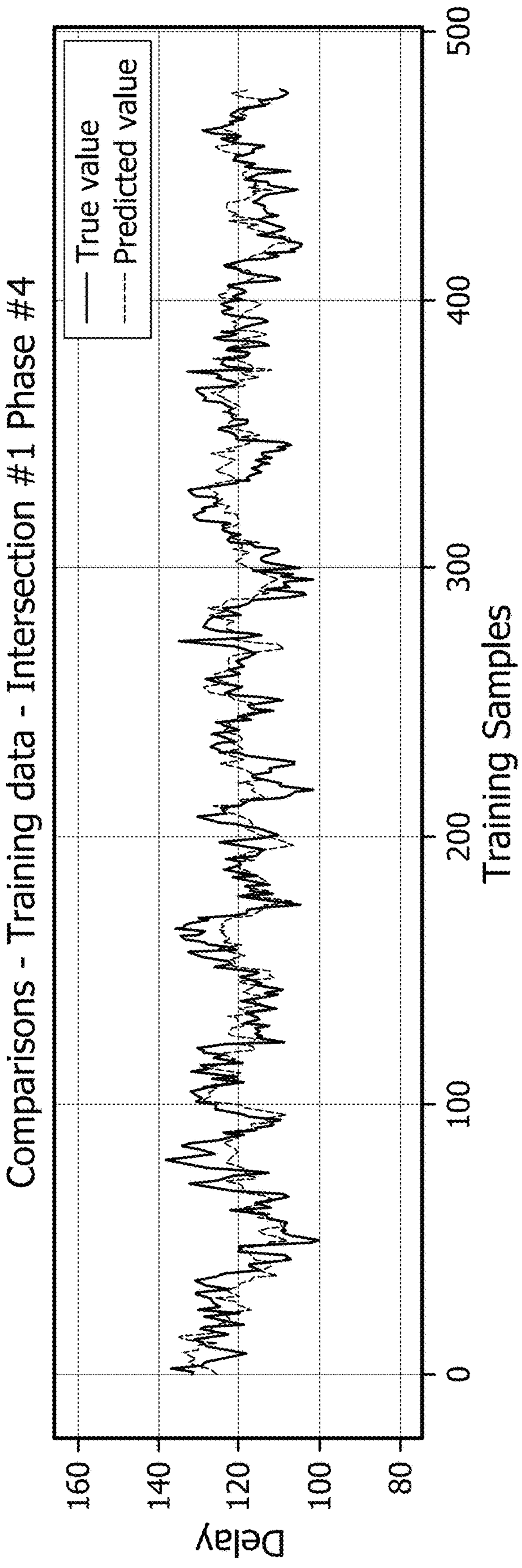
Figure 12D:
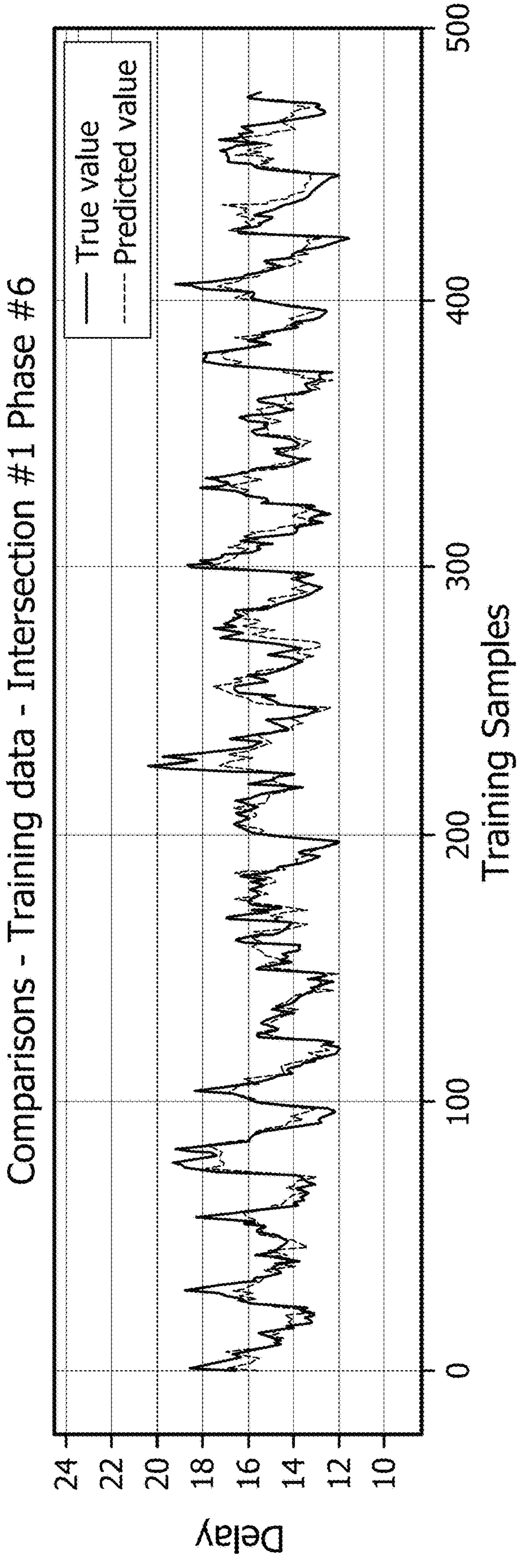
Figure 13A:
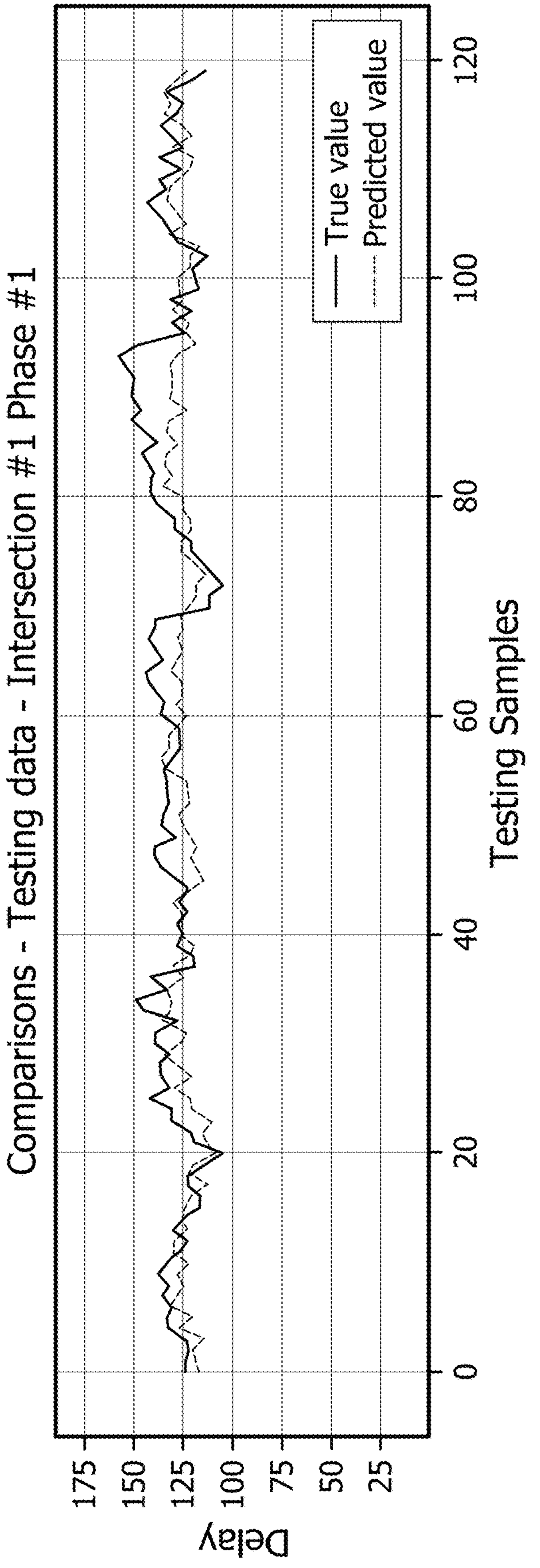
FIGS. 13(*a*)-13(*d*) (collectively referred to as "FIG. 13") provide graphs showing delay comparisons from testing data at an intersection.
Figure 13B:
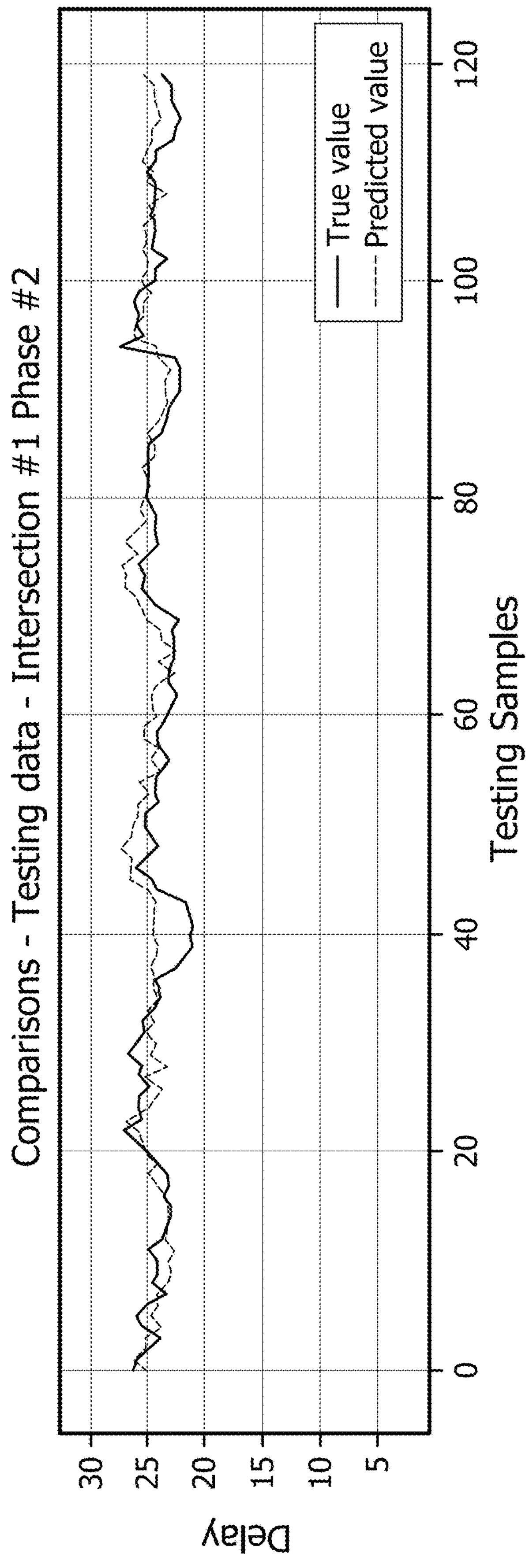
Figure 13C:
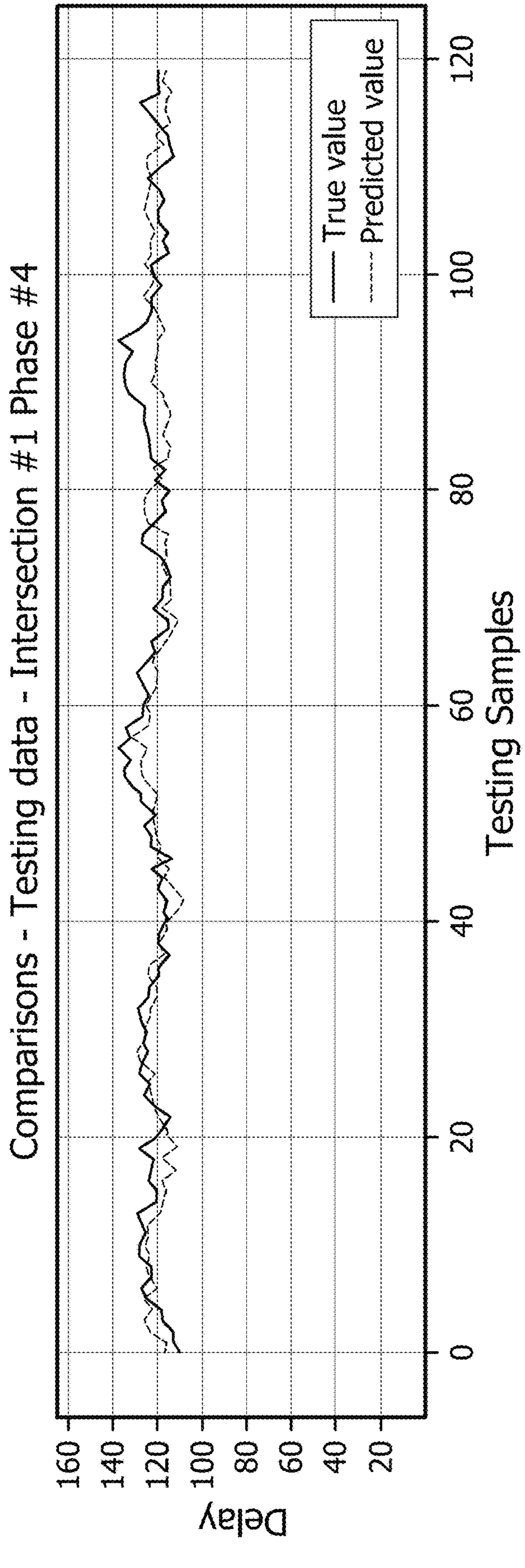
Figure 13D:
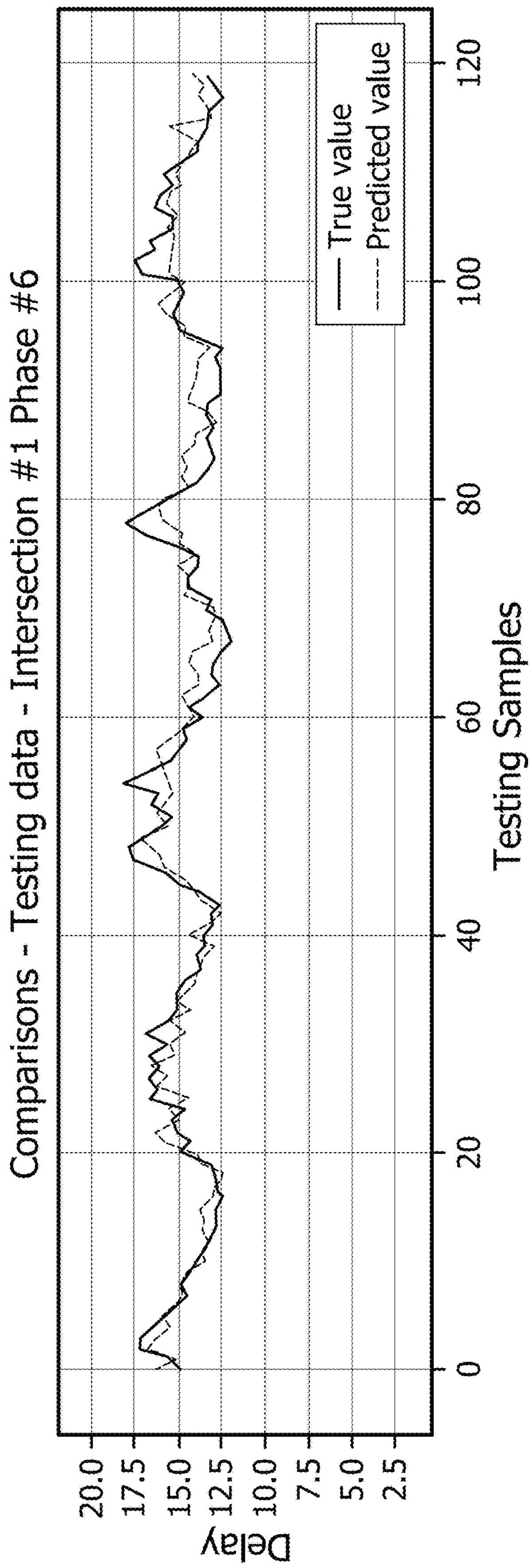

FIGS. 10-11 show the error and the distribution of the PDF of testing errors. Such a shape of PDF for the modeling error is close to a narrowly distributed Gaussian PDF. This shape indicates that no further information in the modeling error is useful for the training, and thus, the training is complete. This is also applied to the PDF exhibition for the testing results of the training as shown in FIG. 11.

FIG. 12 shows comparisons of training of vehicle travel delay from the HNN model and the simulation-generated delay data of each phase at intersection 1. There are four phases at intersection 1.

FIG. 13 shows comparisons of predicted (testing) vehicle travel delay from the HNN model and the true delay of each phase at intersection 1 generated from the simulation platform. Again, there are four phases at intersection 1. FIGS. 13*a*-13*d* show the delay comparisons of each phase, respectively.

Comparison with Real Data Modeling Effect

To test the accuracy of the training using simulation-generated data, real system data for the same period as given in TABLE I were collected and used to train the structured HNN.

Figure 14:
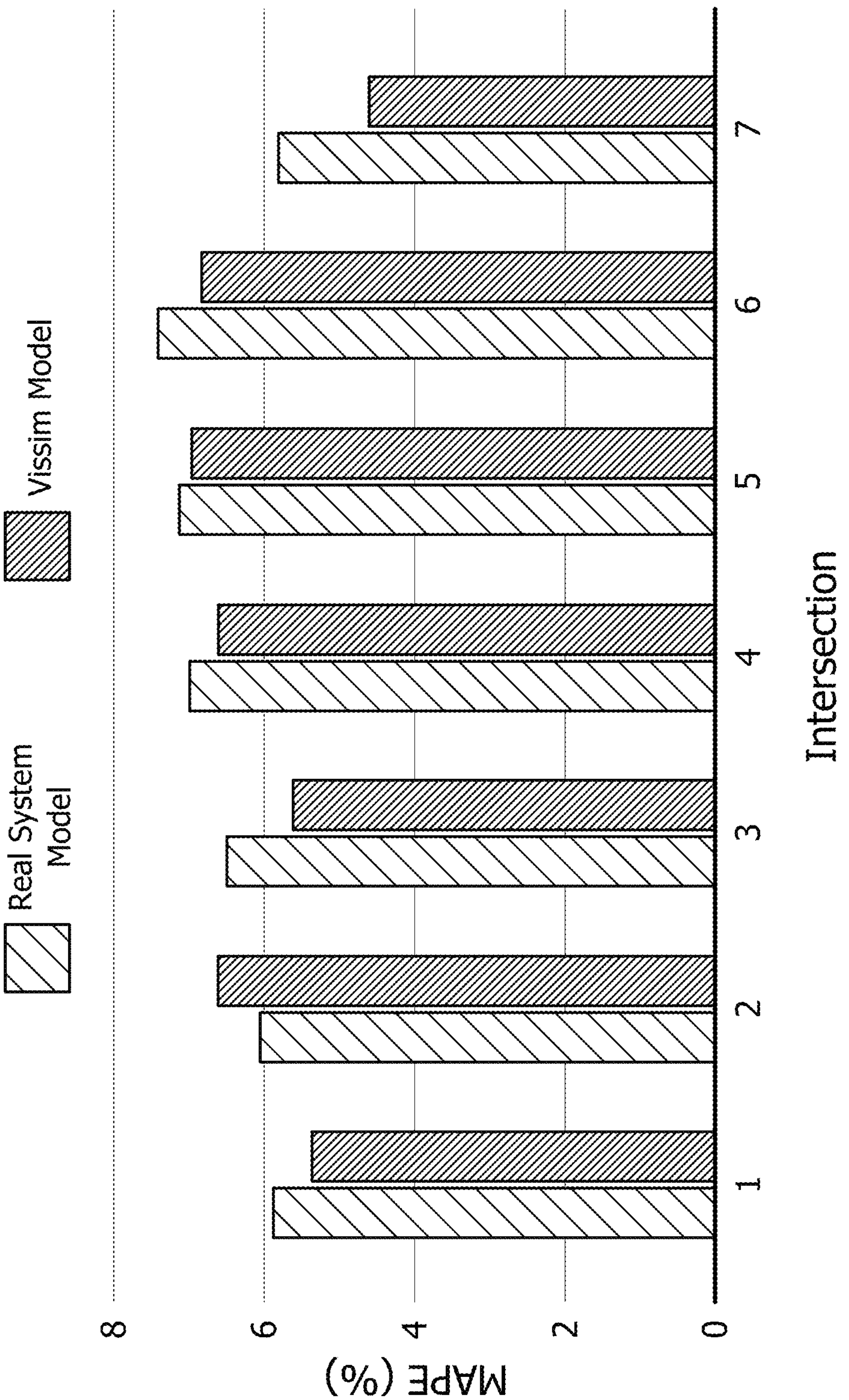
FIG. 14 provides a graph showing a comparison of mean absolute percentage errors—the use of simulation data verse real system data.

The modeling errors comparison is shown in FIG. 14, where blue indicates the modeling error trained using the real system data (i.e., the ECONOLITE® system), and red indicates the modeling error using simulation-generated data. These two errors are reasonably close to each other—showing the effectiveness of the obtained VISSIM simulation platform, although further calibration of such a microscopic traffic simulation is still needed.

The comparable errors in FIG. 14 indirectly indicate the level of acceptance of the VISSIM simulation platform. Because the differences between two group of errors are small, the VISSIM simulation system, as a digital twin, can be regarded as a good representation of the original system dynamics.

Herein, MIMO HNN modeling is described for multiple intersections along a corridor with a comparison between the modeling effects of real and simulated data. A VISSIM simulation platform is presented that was preliminarily calibrated using real system data so that real-time implementation can be realized in a simple, comprehensive way. The disclosed HNN model can capture both the linear and nonlinear stochastic natures of multiple traffic features (i.e., traffic signal timings, traffic flows, and travel delays).

Both simulated and real data were used to train the HNN model, and the comparison between the modeling errors for each case were analyzed—showing a similar performance effect in terms of the modeling as shown in FIG. 14. This similarity also indirectly indicates that the VISSIM simulation platform can reasonably represent the real system dynamics.

It is demonstrated here that a real-time implementation of AI-based transportation system modeling and control can be provided by the present solution. The HNN model may be further refined using data collected from more intersections. An AI-based optimal traffic control system can be designed based on the model to minimize entire system costs, including travel delay and energy consumption.

AI-based control design is required to establish a real-time closed-loop feedback control system that uses the traffic flow state as feedback. This approach controls the signal timing intelligently at intersections so that the resulting traffic flow can be made smoother with minimized energy consumption. This control method requires controller design using AI techniques together with the VISSIM microscopic traffic simulation platform. Because of the random nature of traffic flow systems, stochastic optimal control in a multi-objective Bayesian framework will be investigated in the future.

Advances in data acquisition systems and wireless communications, such as 5G, have greatly facilitated high-resolution data sharing across roadway networks (both highways and urban streets), bringing the Vehicle-to-Everything (V2X, such as vehicle-to-vehicle and vehicle-to-infrastructure) concept to reality. The information from V2X communication systems can be combined with traffic flow models to help design traffic control decisions to effectively balance traffic congestion across complex intersections and facilitate smoother traffic flow. Improving traffic safety and operational efficiency lies at the heart of traffic flow modeling, which lays the groundwork for emerging smart mobility and in-telligent traffic control system operations. In addition, traffic demand and traffic flow can be significantly influenced by uncertainties and randomness in traffic participants' behaviors and environmental factors such as weather, time of day, incidents, events, constructions, thereby making the system a multi-input and multi-output (MIMO) stochastic dynamic system. To capture the stochasticity of MIMO traffic flow systems, various traffic flow models (e.g., travel delay models, vehicle speed prediction models, energy consumption models) have been proposed and tested against road-side sensor data. These methods utilized only a single data source (univariate), and the model predictions can be improved using multivariate models. Some of the well-known modeling methods include time series regression, AutoRegressive Integrated Moving Average (ARIMA) models, artificial neural networks (ANNs), multi-layer percep-trons (MLPs), convolutional neural networks (CNNs), etc. Most of the models worked well for simple use cases but failed to capture the nonlinear spatio-temporal correlations of traffic data. In such cases, recurrent neural networks (RNNs) and long short-term memory (LSTM) applications have been demonstrated as advantageous in capturing non-linear spatial and temporal dependencies of traffic features. In addition, graph neural networks (GNNs) have also been shown to be powerful for large-scale traffic systems, since GNNs can extract features from graph-structured data and predict future traffic states in an efficient and effective manner with existing high-performance computing resources.

In addition to finding the best model representing the stochastic nature of traffic flow systems, one of the important criteria is the reliability and confidence in the developed models for real-time signal control implementation. Although the accuracy of the above-mentioned modeling approaches was sufficient in predicting the response of the variable of interest, the end use case with real-time signal control implementation is difficult to achieve due to complex model architectures and high dimensional weight matrices, leading to increased computational burden. Note that the end application of any of these modeling and prediction approaches is to alleviate the existing problems (e.g., travel delay) and increase human comfort on the road. There are several aleatory and epistemic uncertainties affecting the possibil-ities to achieve this required objective, but one effective controllable factor is the signal timing plan, which can have positive influence on several other factors when executed properly.

Most machine learning (ML) methods use various models to find the optimal model structure for minimizing the error between predicted and actual values. However, the problem is not solved completely by developing sophisticated models to accurately predict factors such as delay, vehicle speed, and travel time. There should be a way to control the factors that affects the response variable of interest (e.g., delay, energy consumption) in real time.

For instance, consider the generic form of the delay prediction model given in the following format $$Y_i,\ k(t+1) = F\{X_{i,k}(t)\} + \epsilon_{i,k}(t+1), \tag{24}$$

where i represents an intersection number, k represents a phase number, t represents the time step representing the progression of sampling instant, Y(t+1) represents a delay at time t+1, X represents an input vector (e.g., delay, green duration and vehicle volume) observed, $\epsilon$(t+1) represents a model error at time t+1, and F represents a non-linear function.

In the above equation, the non-linear function F can be easily approximated using any ML model (e.g., ANN, RNN, etc.) to predict the required response Y. The model parameters are estimated with the objective of minimizing the error defined by the difference between actual and predicted values. Once the model for predicting the one-step-ahead delay Y(t+1) is available, the optimized signal control plan can be devised. However, the prediction model given in mathematical equation (24) is highly non-linear with a neural network, making the signal control optimization problem non-linear and even NP-hard in most cases.

More recently, deep reinforcement learning (DRL) algorithms have been studied extensively and made significant progress in traffic control domains. DRL algorithms directly provide controls that are rooted in the Markov decision process (MDP) by adapting to real-time changes in traffic environment with a rewarding or penalizing criterion, and they learn sequentially from the collected state action pairs for each intersection. There are several key challenges, including defining the environment, setting up the reward function, modeling the relationships between actions and future reward, and, most importantly, coordination and information sharing between multiple agents representing the intersections. In addition, DRL-based approaches are approximations of classic dynamic programming methodology, where the approximations (for both value and policy) are performed based mostly on ML models using the observed state vector, which again takes the functional form F given in mathematical equation (24).

Although AI theory for modeling and signal control is maturing, several challenges remain in terms of field testing and closed loop control implementation for signalized intersections. Some of the reasons include insufficient data for fast feedback control, complex models, lack of infrastructure, inability of the models to capture the nonlinear and dynamic stochastic nature with high reliability, and robustness for urban road networks. In the literature, the inventors proposed a hybrid neural network model (HNN) that can overcome the aforementioned challenges and suitable for fast real-time implementation. The HNN modeling results were promising and have been successfully applied to all corridors.

A hybrid recurrent neural network (HRNN) method for modeling nonlinear dynamic traffic systems is proposed herein to achieve both modeling accuracy and ease of real-time control implementation. The objective is to predict delay one time step ahead as a function of current delay, traffic volume, and green light duration. The control variable being considered is the green light duration and represented in a linear term, whereas non-linearity of the traffic are captured by the RNN model. This reduces the complexity of the optimization problem to obtain the optimal green light duration for real-time implementation. This hybrid modeling approach was tested for 34 signalized intersections divided into 4 corridors along the Ala Moana Boulevard and Nimitz Highway arterial in Honolulu, as shown in FIG. 3. Real-world event-based detector data was collected and used for model training and validation. The proposed hybrid modeling approach shows better performance in terms of both modeling accuracy (training and testing) and runtime computational burden when compared with several of the most commonly used ML-based modeling approaches.

Data Description

As discussed above, the present solution concerns a model for predicting traffic delay at signalized intersections. The model's inputs can include, but are not limited to, the current delay, traffic volume, and green light duration of all phases (e.g., left turns, right turns, and through movements) of each intersection. A total of 34 signalized intersections in Honolulu, Hawaii were considered, as shown in FIG. 3. The large dots in FIG. 3 placed along the arterial show the locations of the considered intersections.

All intersections along this arterial road are equipped with the Centracs Signal Performance Measures (SPM) data collection system by Econolite. This system uses video cameras, magnetic detectors, and the Cobalt advanced traffic control (ATC) controller to collect high-resolution traffic event data for all intersections. Every approach to these intersections is equipped with one camera to capture traffic event data for all signal phases. For every lane and phase, the cameras and/or magnetic sensors act as three types of detectors: (a) advanced detectors that locate a few hundred feet upstream from the stop bar to record the vehicle arrival events; (b) stop bar detectors that detect vehicle presence for an area directly upstream of the stop bar and trigger vehicle calls to the signal controller; and/or (c) pulse detectors located immediately downstream of the stop bar to detect vehicle departure events.

Note that the current Econolite system implemented in the real world is capable of processing the raw camera video data into detector events data in real time. The data processing presented herein is to take these unstructured detector events data as input to derive the estimation of traffic delay, signal duration, and volume information. The data processing method is designed to be real-time executable and is currently undergoing implementation to the actual signal control system in Hawaii.

Data Processing

The Centracs SPM system records historical high-resolution data. The data is collected at one second intervals for every phase along the intersections as high-resolution event data in a format developed based on the research conducted by the Purdue University and the Indiana Department of Transportation (INDOT).

FIG. 15 shows an excerpt of the raw event data. The three columns in FIG. 15 represent timestamps of each event, event code, and event parameter. Detector triggering events are assigned with unique event parameters (i.e., identification). Each detector on and off event is associated with a unique event code. For example, as shown in FIG. 15, event code 82 indicates the "detector on" event, and event code 81 indicates the "detector off" event. Similarly, different event codes also represent different signal switching events and event parameters denote the corresponding phases of such events. For example, FIG. 15 contains a "green off" event (event code 7) for phase 5, and a "green on" event (code 1) for phase 2 and then phase 6. The event parameters are defined in literature, and event codes are based on the intersection's detector layout from Econolite. All detector and signal events were extracted from the raw high-resolution data. By calculating the timestamp differences between "green on" and "green off" event code, the green light duration can be calculated. The total number of "detector on" events at advanced detectors or pulse detectors indicates the vehicle count of each phase. The number of advanced detector events should match the number of pulse detectors, but there could be missing data that lead to discrepancies among the detectors. Volume was calculated as the maximum total number of "detector on" events of advanced detectors and pulse detectors.

Figure 16:
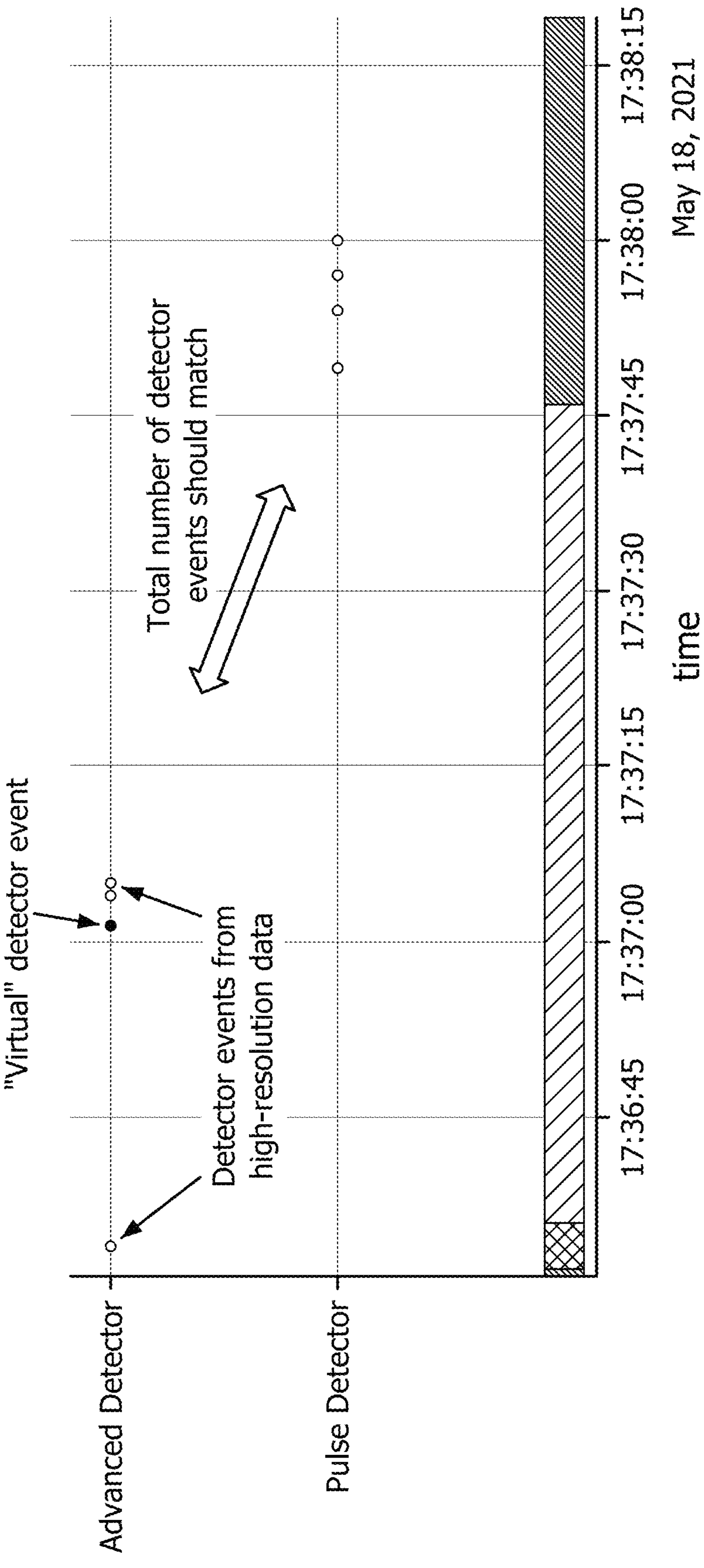
FIG. 16 provides a graph that is useful for understanding how missing data is handled by the system.

To analyze data discrepancies, the actual video clips from traffic cameras were manually processed and labelled. The data discrepancies mostly occurred at advanced detector locations (hundreds of feet away from the stop bar), where the detectors failed to detect vehicles when they were further away from the cameras and only appear as very few camera pixels in the images. The advanced detectors' accuracy depends on the configurations (e.g., detectors' distance to intersection, geometry of the road, number of lanes) of each intersection. On the other hand, at pulse detector locations (immediately downstream of the stop bar), the traffic camera system usually can detect vehicles accurately. Because most of the data discrepancies were missing counts at the advanced detectors, whenever the number of advanced detector events and those of pulse detectors did not match, additional artificial detector calls were added. For example, as shown in FIG. 16, there were three advanced detector events during the red light period, but there were four pulse detector events during the queue discharge (i.e., the green light period). This indicates that an advanced detector event was missing. Thus, an artificial detector call (i.e., the orange dot) was added. The timestamp of this artificial detector call was calculated as the average of two other timestamps: (a) the average time of all registered advanced detector events; and (b) the middle time of the red signal light. Once missing data was filled in based on the aforementioned approach, the travel delay was calculated based on the method described below. The missing data handling approach was developed to help address limitations of the current video-based traffic detection system.

Delay Calculation

Figure 17:
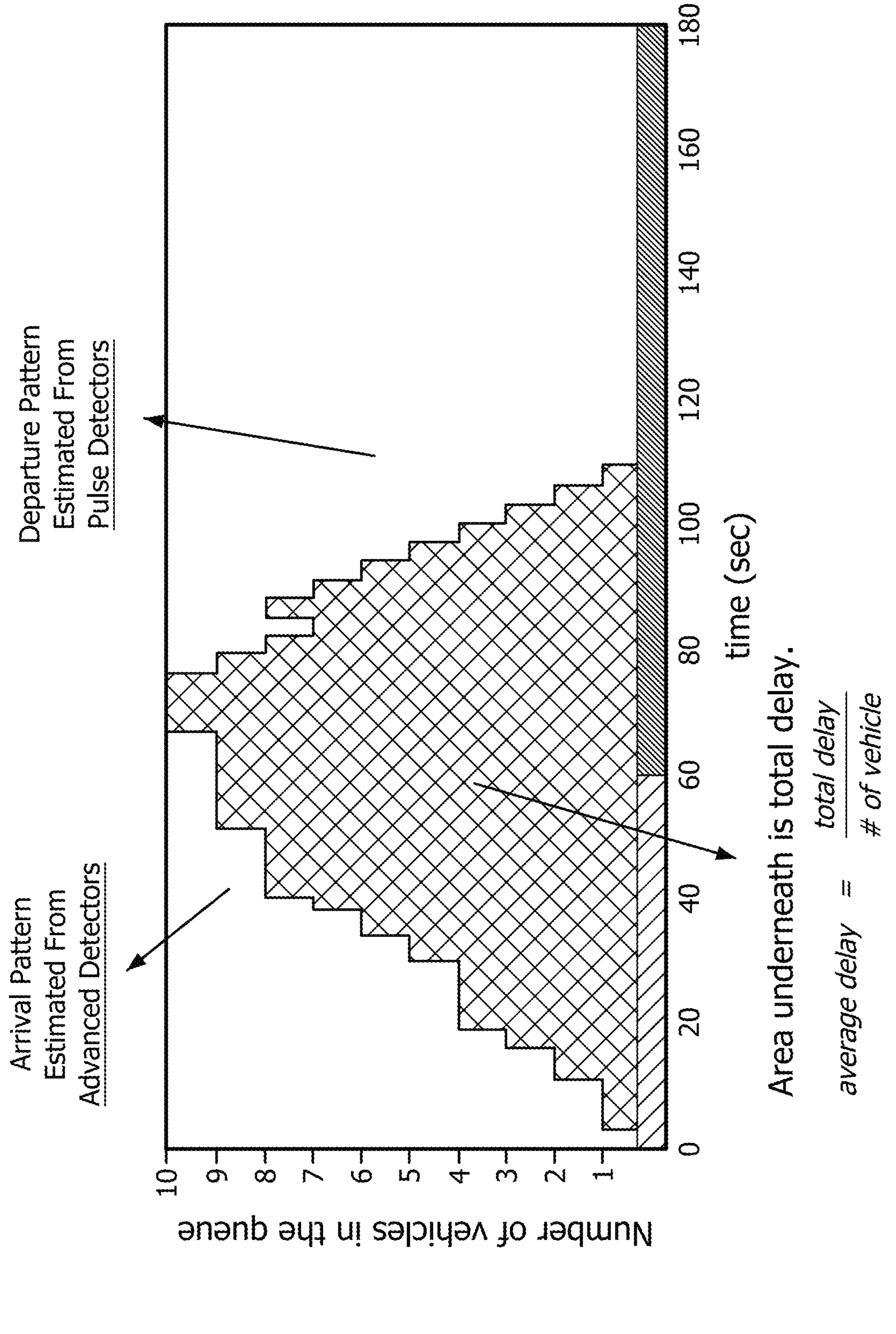
FIG. 17 provide a graph showing results of delay calculations.

After all the detector events, volumes, and green light durations were extracted, the traffic delay was calculated. The calculation was based on the queue estimated for each lane of each phase. Advanced detector events record the vehicle arrival patterns, and pulse detector events measure the vehicle departure patterns. The vehicle queue at each lane can be estimated based on the method depicted in FIG. 17. The total traffic delay is the total wait-in-queue time duration of all vehicles in the queue, which is the shaded area 1700 in FIG. 17. As such, the average delay was calculated by dividing the total delay by the number of vehicles. The final processed data were obtained in a structured format suitable for supervised learning.

Hybrid Modeling Methodology

Development of the hybrid modeling framework for the required data driven prediction and control implementation is now described. Before proceeding directly with implementing ML models, a simple dynamic MIMO linear model was attempted based on below mathematical equation (25) to check whether the system could be well represented as a linear system. The output vector from this model groups the one-step ahead travel delays of all the phases while the input vectors to the model are current delay, signal timing plan and traffic volume. Such an MIMO model represents the linear relationship between the input and output vectors and the idea is to predict travel delays at time step (t+1) using the available input data at time step t. The linear model will be easier to solve for deciding optimal signal control plans as those presented in the literature, which were formulated as a linear quadratic optimization problem.

$$y_{i,k}(t+1) = Ay_{i,k}(t) + Bu_{i,k}(t) + Cv_{i,k}(t) + \epsilon_{i,k}(t+1) \tag{25}$$

where i represents an intersection number, k represents a phase number, $y_{i,k}(t)$ represents a delay at time t, $u_{i,k}(t)$ represents a green light at time t, $v_{i,k}(t)$ represents a vehicle volume at time t, $\epsilon_{i,k}(t+1)$ represents a model error at time t+1, A represents a parameter to be estimate, B represents another parameter to be estimated, and C represents yet another parameter to be estimated.

The ordinary least squares (OLS) method was used to determine the unknown parameter matrices denoted by {A, B, C} with available data. The mean absolute percentage error (MAPE) of the linear model errors turned out to be around 30% and showed a non-linear relationship between input and output variables. This was consistent with the results presented in the reference. To improve the prediction accuracy and ensure the model's suitability for signal control implementation, a hybrid modeling method that captures the nonlinear dynamics of the system was derived to reflect the relationship between input-output factors.

Hybrid Recurrent Neural Network Formulation

Though the aforementioned linear model in mathematical equation (25) is well-suited for implementing signal control algorithms, the model does not seem to work well for prediction purposes. The use of ML models has outperformed most of the linear modeling approaches over time. Since the dataset under consideration is MIMO time series data, RNNs would be well-suited for prediction purposes. This is because RNN is a type of neural network architecture specialized for processing data with temporal dependencies and nonlinearities. Apart from this, the addition of LSTM cells and gated recurrent units (GRU) will help handle vanishing gradient problems and make the model suitable for prediction purposes. Nevertheless, as discussed earlier, all these models have non-linear activation functions, and the model constraint on the control variable increases the complexity of solving RNNs directly. Therefore, the model in mathematical equation (25) was rewritten as mathematical equation (26). Note that for simplicity, i and k notations are omitted in the rewritten mathematical equation and those similar.

$$y(t+1) = Ay(t) + Bu(t) + Cv(t) + F(y(t), u(t-1), v(t); \pi) + \epsilon(t+1) \tag{26}$$

where y(t) represents a delay at time t, u(t) represents a green light at time t, u(t−1) represents a green light at time t−1, v(t) represents a vehicle volume at time t, F represents a nonlinear function, $\epsilon$(t+1) represents a model error at time t+1, $\pi$ represents a parameter to be estimated, A represents a parameter to be estimate, B represents another parameter to be estimated, and C represents yet another parameter to be estimated.

In mathematical equation (26), the volume of vehicles at some of the intersections were determined not to be significant. But as per expert knowledge, vehicle volume could likely play a major role in determining the travel delay. As a result, in this study, the volume of vehicles was included in the non-linear function F modeled using neural network models. If the volume of vehicles was not significant, neural network weights were automatically adjusted to zero for the corresponding intersection. Additionally, the control variable at time t (i.e., the green light duration u(t)) was placed outside the non-linear function F so that mathematical equation (26) can be easily optimized with respect to u(t) and the signal control plan can be implemented in a timely manner. The generalized model is given in mathematical equation (27).

$$y(t+1) = Ay(t) + Bu(t) + F(y(t), u(t-1), v(t); \pi) + \epsilon(t+1) \tag{27}$$

where y(t) represents a delay at time t, u(t) represents a green light at time t, u(t−1) represents a green light at time t−1, v(t) represents a vehicle volume at time t, F represents a nonlinear function, $\epsilon$(t+1) represents a model error at time t+1, A represents a parameter to be estimated, B represents a parameter to be estimated, and $\pi$ represents a parameter to be estimated.

Function F in mathematical equation (27) was approximated using the RNN architecture with $\hat{F}(y(t), u(t-1), v(t))$ to estimate the delay $\hat{y}(t+1)$. The advantage of this model in mathematical equation (27) is that the control variable of interest (green light duration) is still represented in a linear form, so the optimization problems proposed in the literature for optimum controls can be solved efficiently for real-time implementation. In addition, the other variables inside the nonlinear term represented by function F capture the variance left over from the linear model, thereby improving the model accuracy in one-step ahead delay prediction. The following subsection provides the methodology to solve the HRNN model described in mathematical equation (27).

HRNN Model Training and Gradient Update Procedure

The model training and gradient update rule for the proposed hybrid modeling approach will now be discussed. The overall objective of the training algorithm is to minimize the error defined by the performance function given in below mathematical equations (28) and (29).

$$\text{Minimize: } E(t+1) = \frac{1}{2}[\hat{y}(t+1) - y(t+1)]^2 \tag{28}$$

$$\hat{y}(t+1) = Ay(t) + Bu(t) + \hat{F}(y(t), u(t-1), v(t); \pi) + \epsilon(t+1) \tag{29}$$

where ŷ(t+1) is one-step-ahead predicted delay, A represents a parameter to be trained using real-time data from Econolite systems, B represents a parameters to be trained using real-time data from Econolite systems, and π represents a parameter to be trained using the real-time data from Econolite systems. In terms of the RNN model, the vector π includes the weights for three matrices U, V and W, as shown in the RNN architecture in FIG. 18.

Figure 18:
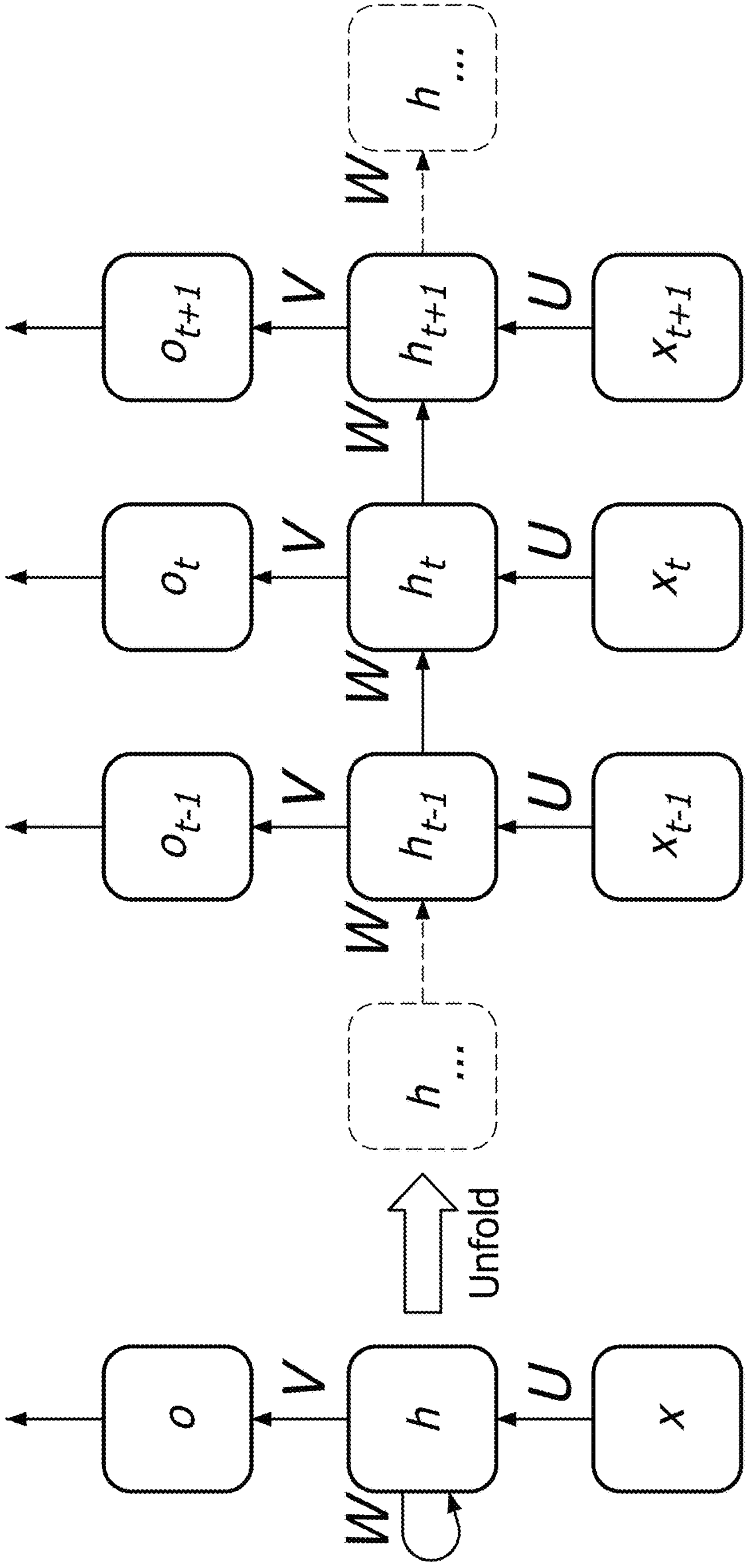
FIG. 18 provides an illustration of a recurrent neural network architecture.
Figure 19A:
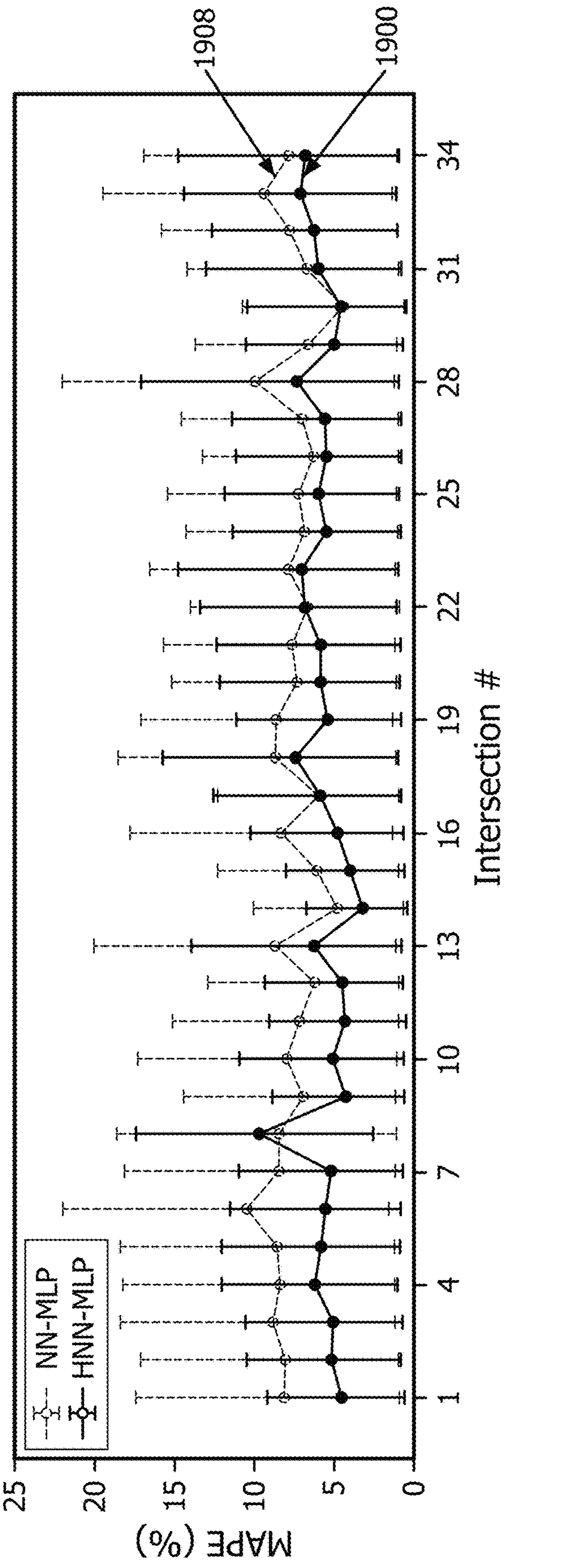
FIGS. 19(*a*)-19(*d*) (collectively referred to as "FIG. 19") provides graphs showing comparisons of MAPE (%) along with error bars for different modeling frameworks.
Figure 19B:
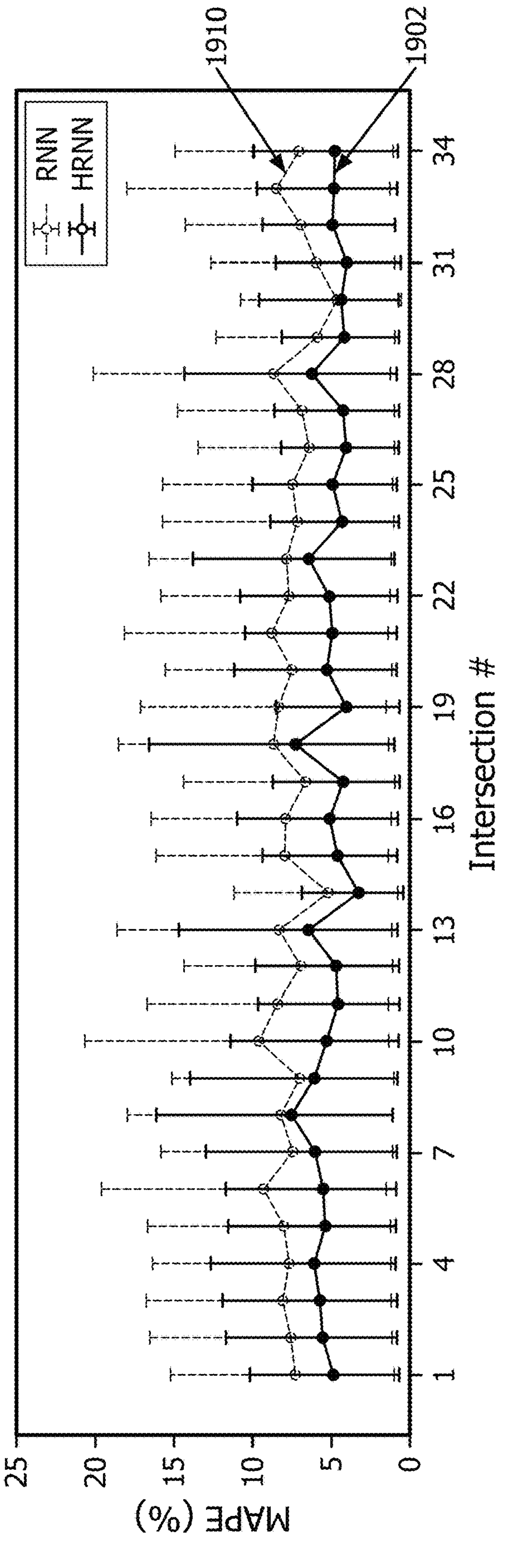
Figure 19C:
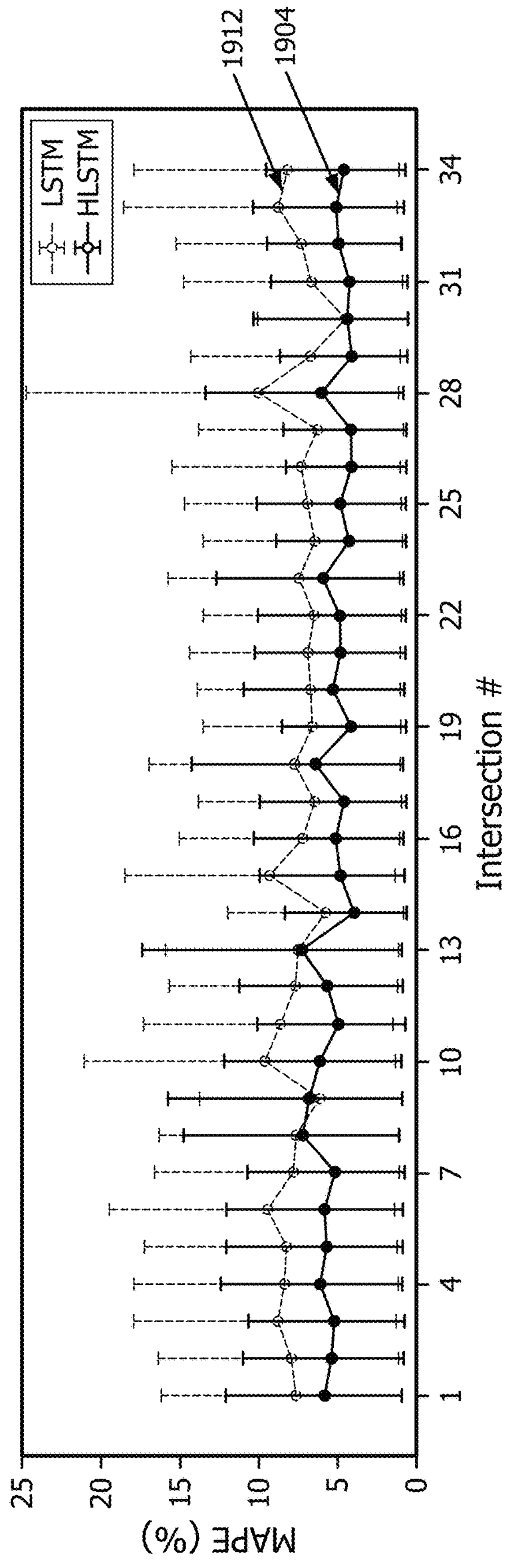
Figure 19D:
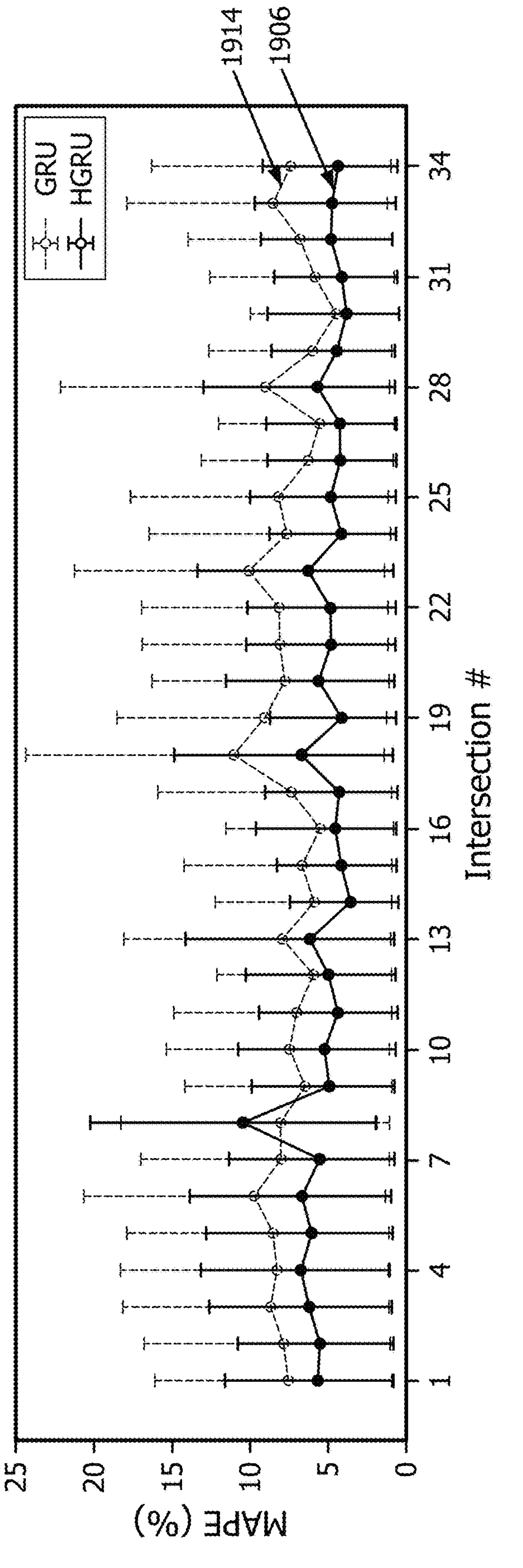

As depicted in FIG. 18, the RNN takes in a multi-input vector Xt as a sequence. The inputs are processed inside hidden units ht at time t, which acts as a memory of the network. The hidden units ht have connections with the input vector parameterized by weight matrix U, as well as a second connection (hidden-to-hidden recurrent connections) parameterized by a weight matrix W, and a third connection (hidden-to-output connections) parameterized by a weight matrix V. All of the weights in the matrices {U, V, W} are shared across time. Thus, the HRNN's forward pass will sweep through all matrices {A, B, U, V, W}, as represented by mathematical equations (30)-(36).

$$\text{out}_1(t) = A_y(t) \tag{30}$$

$$\text{out}_2(t) = Bu(t) \tag{31}$$

$$a(t) = b + Wh(t-1) + Ux(t) \tag{32}$$

$$h(t) = \sigma_1 a(t) \tag{33}$$

$$o(t) = c + Vh(t) \tag{34}$$

$$\text{out}_3(t) = \sigma 2 o(t) \tag{35}$$

$$\hat{y}(t+1) = \text{out}_1(t) + \text{out}_2(t) + \text{out}_3(t) \tag{36}$$

Mathematical equations (30) and (31) represent the linear model, where the outputs {$\text{out}_1$(t), $\text{out}_2$(t)} are weights {A, B} multiplied by corresponding input vectors. Mathematical equation (32) denotes the start of the RNN layer where the intermediate output a(t) is calculated using the input vector x(t) at time t and the information h(t−1) from the previous time step t−1. This vector a(t) is transformed by passing through an activation function $\sigma_1$, as given in mathematical equation (33). The output of the RNN sequence is derived using mathematical equations (34) and (35) by passing through another activation function $\sigma_2$. The final output of the HRNN model ŷ(t+1) is obtained by combining the outputs of all intermediate layers: {$\text{out}_1$(t), $\text{out}_2$(t), $\text{out}_3$(t)}.

Once the forward propagation is completed, the loss is calculated using the functional form given in mathematical equation (28). To minimize the error, the model weights are updated by back-propagating through the layers and calculating the gradients. Considering T as the length of the time series—in other words, the total number of data points—the runtime of HRNN model is O(T) and cannot be reduced using parallelization because the forward propagation process is inherently se-quential, and each time step will be computed only after the previous one. The values computed during the forward pass are stored until they are reused during the backward pass, and thus the memory cost of HRNN is also O(T). This process of gradient calculation using forward and back-propagation completes the back-propagation through time (BPTT) step for HRNN modeling method.

Note that in mathematical equations (30)-(36), the parameters were shared throughout all time steps by the network. Thus, the gradient at each output depended not only on the calculations of the current time step, but also on the previous time steps. The weight updates to all the parameter matrices {A, B, U, V, W} with corresponding learning rates ($\lambda_i$, i=1, . . . , 5) are given in mathematical equations (37)-(42).

$$\hat{A}(t+1) = \hat{A}(t) - \lambda_1 \frac{\partial E}{\partial A}\Big|_{\hat{A}(t),\hat{B}(t),\hat{U}(t),\hat{V}(t),\hat{W}(t)} \tag{37}$$

$$\hat{B}(t+1) = \hat{B}(t) - \lambda_2 \frac{\partial E}{\partial B}\Big|_{\hat{A}(t),\hat{B}(t),\hat{U}(t),\hat{V}(t),\hat{W}(t)} \tag{38}$$

$$\hat{U}(t+1) = \hat{U}(t) - \lambda_3 \frac{\partial E}{\partial U}\Big|_{\hat{A}(t),\hat{B}(t),\hat{U}(t),\hat{V}(t),\hat{W}(t)} \tag{39}$$

$$\hat{V}(t+1) = \hat{V}(t) - \lambda_4 \frac{\partial E}{\partial V}\Big|_{\hat{A}(t),\hat{B}(t),\hat{U}(t),\hat{V}(t),\hat{W}(t)} \tag{40}$$

$$\hat{W}(t+1) = \hat{W}(t) - \lambda_5 \frac{\partial E}{\partial W}\Big|_{\hat{A}(t),\hat{B}(t),\hat{U}(t),\hat{V}(t),\hat{W}(t)} \tag{41}$$

$$0 \le \lambda_1, \lambda_2, \lambda_3, \lambda_4, \lambda_5 \le 1 \tag{42}$$

Note that the partial derivatives ∂E/∂A, ∂E/∂B are straightforward to calculate, and the derivatives belonging to the RNN layer ∂E/∂U, ∂E/∂V, ∂E/∂W need the chain rule to calculate the gradient. For instance, let E denote the error at a certain time step inside the RNN layer, the partial derivative with respect to weight matrix U, i.e., ∂E/∂U, is derived using the chain rule as given in mathematical equation (43) to update the weights in (37)-(42).

$$\frac{\partial E}{\partial U} = \frac{\partial E}{\partial \hat{y}} \cdot \frac{\partial \hat{y}}{\partial U} = (\hat{y} - y) \cdot \left( \frac{\partial \text{out}_3}{\partial o} \cdot \frac{\partial o}{\partial h} \cdot \frac{\partial h}{\partial a} \cdot \frac{\partial a}{\partial U} \right) \tag{43}$$

The drawback of RNN model is the vanishing or exploding gradient problem during back-propagation for some cases. Generally, this problem can be solved using gradient clipping and batch normalization methods. However, if the problem persists, then the LSTM or GRU cells can be added to the HRNN architecture, as discussed below.

Results

Results of the proposed hybrid modeling methodology are now discussed. Prior to model training and evaluation stage, the raw data were pre-processed to remove outliers. Any missing values were imputed using the K-nearest neighbors (KNN) approach with k=5. Since the multivariate data were measured at different scales, such as delay (in seconds) and the number of vehicles (discrete units), the dataset was normalized to scale the data between zero and one. For traffic delay data, after normalization, simple exponential smoothing was applied to further filter the data to remove noise, as shown in mathematical equations (44) and (45), where l(t) is the filtered delay, y(t) is the normalized delay, and α is the smoothing factor between zero and one. As a decreases, the observation of delay at time t has less impact on the output y(t), indicating that the randomness of the delay measurements is reduced.

$$l(t)=\alpha y(t)+(1-\alpha)l(t-1) \quad (44)$$

$$0<\alpha<1 \quad (45)$$

In this study, the thirty-four intersections consisting of one hundred thirty three phases along the arterial in FIG. 3 were divided into four corridors. The data were collected for the period of Mar. 1, 2021 to Jun. 30, 2021, and models were fitted to evening peak hours from 4:00 pm to 7:00 pm on weekdays. The training and testing data were split in the ratio of eighty to twenty. In total, four corridor level HRNN models were trained using eighty percent of the total data (March-May, 2021) and validated with twenty percent of the remaining total data (June 2021). The HRNN structure used for this study is shown in FIG. 7.

The loss function used for the delay prediction model was MAPE, as given in mathematical equation (46), where yk(t) is the true delay at time t of phase k, and $\hat{y}_k(t)$ is the predicted delay at time t of phase k.

$$MAPE=\frac{1}{KT}\sum_{t=1}^{T}\sum_{k=1}^{K}\left|\frac{y_k(t)-\hat{y}_k(t)}{y_k(t)}\right| \quad (46)$$

In addition to splitting up the corridors and using the HRNN model, other variants of RNNs were also utilized inside the proposed framework—namely, hybrid long short-term memory (HLSTM) and hybrid gated recurrent units (HGRU), in addition to the original HNN-MLP model developed in the literature. The mathematical equations in the previous subsection remain the same for HLSTM and HGRU versions, except for the hidden layer (ht), as discussed below.

Long Short Term Memory (LSTM)

In the HRNN model, the hidden unit (which usually computes a weighted sum of the input signal and applies a nonlinear function) was modified to maintain a memory ct (input, forget, and output) at time t for each LSTM block m as given in mathematical equations (47) and (48).

$$h_t^m=o_t^m\tanh(c_t^m) \quad (47)$$

$$o_t^m=\sigma(W_o x_t+U_o h_{i-1}+V_o c_t)^m \quad (48)$$

The value ct is the value of memory cell at time t. The value ct was updated by partially forgetting the current memory and adding a new memory $\hat{c}_t$. The extent to which this existing memory was forgotten is modulated by a forget gate $f_t$, and the degree to which the new memory content is added to the memory cell was modulated by an input gate $q_t$ as given in mathematical equations (49)-(52).

$$c_t^m=f_t^m c_{t-1}^m+q_t^m\hat{c}_t^m \quad (49)$$

$$\hat{c}_t^m=\tanh(W_c x_t+U_c h_{t-1})^m \quad (50)$$

-continued $$f_t^m=\sigma(W_f x_t+U_f h_{t-1}+V_f c_{t-1})^m \quad (51)$$

$$q_t^m=\sigma(W_q x_t+U_q h_{t-1}+V_q c_{t-1})^m \quad (52)$$

In the HRNN, the hidden (recurrent) unit overwrites its content at each time step. However, in the HLSTM, the gates in the hidden unit will help decide whether the existing memory can be kept or removed. The advantage of the LSTM cell is that it helps remember long term dependencies in the data.

Gated Recurrent Units (GRU)

In some cases, the dataset with short term dependencies might not make LSTM a good candidate. Therefore, a GRU version was explored to allow each hidden unit to adaptively capture short term temporal dependencies. Unlike LSTM, the GRU has only two gates (update $z_t$ and reset $r_t$ gates) that modulate the flow of information inside the hidden unit, $h_t$, given in mathematical equations (53) and (54).

$$h_t^m=(1-z_t^m)h_{t-1}^m+z_i^m\hat{h}_t^m \quad (53)$$

$$z_i^m=\sigma(W_z x_t+U_z h_{t-1})^m \quad (54)$$

$$\hat{h}_t^m=\tanh(Wx_t+U(r_i\odot h_{t-1}))^m \quad (55)$$

$$r_i=\sigma(W_r x_t+U_r h_{t-1})^m \quad (56)$$

The update gate $z_t$ will decide on the extent to which the unit updates its activation or content in addition to candidate activation unit $$\hat{h}_t^m$$

with reset gate for each GRU block m as given in mathematical equations (55) and (56).

Once all abovementioned hybrid models were constructed, their performance varied drastically during the initial evaluation stage for individual phases at each intersection. There was a common pattern that one model seemed to work well, in terms of testing errors, for certain intersections but performed poorly for others in the same corridor. Thus, it was not possible to conclude that a single model would work well for all intersections, posing a model se-lection problem. This problem was a result of the model hyperparameters being improperly tuned. As a result, a hyperparameter tuning process was derived to address this issue. The following subsection provides details about this hyperparameter tuning process.

Hyperparameter Tuning

The hyperparameters under consideration are the activation function (Sigmoid, ReLu, Exp, SeLu, Linear, etc.,), learning rate (between 0 and 1), and number of neurons in hidden layers (0 to 64). Note that matrices A and B in mathematical equation (27) should be a square matrix for optimal signal timing plan calculations. Therefore, the number of neurons in non-linear function F in mathematical equation (27) is the variable that should be tuned along with the learning rate and activation function. Several methodologies are available to tune all the hyperparameters and select the best model before deciding on the real-time implementation. Some of the methods for tuning model hyperparameters, such as the grid search method and random search method, involve an exhaustive searching procedure using a specified subset of parameter space and suffer from the curse of dimensionality. In addition, the parameter space of ML algorithms usually includes real values or unbounded values for certain parameters. Thus, some parameters should be discretize and the bounds should be manually limited based on the prior knowledge to decrease convergence time and function evaluations, which will affect the model accuracy—especially when there are a large number of hyperparameters. There are huge matrix calculations involved in each epoch of the HNN models, which further increase the computational burden of hyperparameters tuning.

To overcome the aforementioned shortcomings, a Bayesian hyperparameter tuning approach was used herein. The Bayesian optimization method can provide the global optimum, especially with noisy backbox functions such as neural networks. In practice, Bayesian optimization has been shown to obtain better results in fewer evaluations compared to both grid search and random search methods, due to its ability to adaptively sample data points for experimentation before evaluation.

The process of hyperparameter tuning began by randomly initializing two sample points from the given parameter space and evaluated on the objective function. A probabilistic surrogate model using a Gaussian kernel (termed as acquisition/utility function) was built from the original function mapping from these initial promising hyperparameter samples (i.e., the functional form of HNN models was approximated to be Gaussian). The expected improvement (EI) criterion was used to select the next promising sample point for evaluation. This new best guess that minimized the loss was evaluated using the objective function, and the process continued by iteratively evaluating new samples of hyperparameter configurations. This sequentially updated the current surrogate model in turn, and the best possible combination of hyperparameters that minimized the model loss was selected.

After tuning the hyperparameters for all individual models in each corridor, each of the models was trained using the corresponding set of optimum hyperparameters, and the MAPE was used to compare the performance. TABLE IV shows the modeling results for all thirty-four intersections. The learning rate for all the models was tuned and trained with a decay factor of 0.00001. The proposed HRNN, HLSTM, and HGRU models were compared with the existing HNN-MLP model, as well as their counterpart ML architectures. Results in terms of training and testing MAPEs of these models are tabulated in TABLE IV. As shown in the results, the hybrid models show consistently better performance similar than most traditional ML models for all intersections with an MAPE around 10%.

TABLE IV

Comparison of Mean Absolute Percentage Error (MAPE) for Baseline Models (a) and Hybrid Models (b)

| Model Number | Description | Training MAPE (%) | Testing MAPE (%) |
|---|---|---|---|
| 1a | NN-MLP | 7.60 | 11.37 |
| 2a | RNN | 7.47 | 11.38 |
| 3a | LSTM | 7.47 | 11.08 |
| 4a | GRU | 7.57 | 11.21 |
| 1b | HNN-MLP | 5.67 | 8.68 |
| 2b | HRNN | 5.09 | 7.96 |
| 3b | HLSTM | 5.19 | 7.66 |
| 4b | HGRU | 5.22 | 7.20 |

The MAPE evaluates the mean model performance, but there could be extreme values hidden in some cases. To further compare, the model performance for individual intersections along with error bars, which provide the range of model variation with respect to the mean value, were plotted. As shown in FIG. 19, the proposed hybrid models 1902-1906 are more robust as they show smaller MAPE variations than those of the traditional baseline models 1908-1914. In addition, the HGRU model slightly outperforms other models because of the presence of update and reset gates, making it suitable for short-term sequential data. In addition to better modeling results, as demonstrated in the next subsection, the proposed hybrid modeling approach leads to better efficiency for control optimization.

Signal Control Optimization

In order to demonstrate the efficacy of the proposed modeling methodology, a simple signal timing plan for one signal cycle was generated for the nine intersections in first corridor of the study area. The control objective here is to minimize one-step-ahead delay, $Y_{i,k}(t+1)$, as given in mathematical equations (57) and (58).

$$u^*_{i,k}(t) = \underset{u_{i,k}(t)}{\text{argmin}}[Y_{i,k}(t+1)] \tag{57}$$

$$\text{s.t. } L_{i,k} \leq u_{i,k}(t) \leq U_{i,k} \tag{58}$$

where $u_{i,k}$ represents a control variable (e.g., green light duration for intersection i and phase k), $L_{i,k}$ represents a lower bound for color light duration (e.g., green light duration), and $U_{i,k}$ represents an upper bound for the color light duration (e.g., green light duration).

As mentioned previously, the delay at time t+1 in mathematical equation (57) can be represented as a function of current delay, volume, and green light duration in mathematical equation (27). The unknown parameters in mathematical equation (27) were already estimated using a hybrid modeling method, as discussed above. Since the model prediction power has already been shown to be close to the actual value (TABLE IV), the one-step-ahead delay $Y_{i,k}(t+1)$, in mathematical equation (57) is replaced using the estimated delay from the hybrid modeling method $\hat{Y}_{i,k}(t+1)$, as shown in mathematical equation (59).

$$u^*_{i,k}(t) = \underset{u_{i,k}(t)}{\text{argmin}}\left[\hat{Y}_{i,k}(t+1)\right] \tag{59}$$

Several optimization algorithms—such as Trust Region, Interior Point, and Nelder-Mead, etc.—are readily available to solve the optimization problem and arrive at optimal signal control values. However, as mentioned previously, the main advantage of our proposed modeling method is that the control variables (i.e., the green light duration) are represented using a linear form, as shown in mathematical equation (50). Therefore, it is easy to derive an analytical solution for the signal control optimization problem. Because the overall objective is to minimize the delay, the prediction model output is set to be equal to zero.

$$0 = \hat{A}y(t) + \hat{B}u(t) + \hat{F}(y(t), u(t-1), v(t); \hat{\pi}) \tag{60}$$

The matrix $\hat{B}$ may not be a full column rank matrix, and it might not be invertible. Thus, $\hat{B}^T$ is multiplied to both sides of mathematical equation (60), leading to mathematical equation (61).

$$0=\hat{B}^T\hat{A}y(t)+\hat{B}^T\hat{B}u(t)+\hat{B}^T\hat{F}(y(t), u(t-1), v(t); \hat{\pi}) \tag{61}$$

Rearranging the terms will provide an analytical solution to the optimal signal timing variable u(t) given by mathematical equation (62).

$$\hat{u}(t)=-\left(\hat{B}^T\hat{B}\right)^{-1}\left[\hat{B}^T\hat{A}y(t)+\hat{B}^T\hat{F}(y(t), u(t-1), v(t); \hat{\pi})\right] \tag{62}$$

Because the values of all unknown parameters and variables are known until time t, the optimal control values u(t) for the current cycle that minimize the future delay at time t+1 can be obtained using the analytical form in mathematical equation (62). All the matrix calculations were performed using a PC with a 10-core CPU with 16 GB memory, and the runtime results of signal time optimization are provided in TABLE V.

TABLE V

Run-time (in seconds) Comparison for One Signal Cycle for Baseline Models (a) and Hybrid Models (b)

| Model Number | Description | Analytical Method (s) | Trust-Region Optimization (s) |
|---|---|---|---|
| 1a | NN-MLP | N/A | 27.06 |
| 2a | RNN | N/A | 27.30 |
| 3a | LSTM | | 26.67 |
| 4a | GRU | N/A | 26.83 |
| 1b | HNN-MLP | 0.030 | 1.34 |
| 2b | HRNN | 0.031 | 1.26 |
| 3b | HLSTM | 0.030 | 1.25 |
| 4b | HGRU | 0.030 | 1.26 |

The proposed analytical approach is almost ten times faster than solving the signal timing optimization problem using any available optimizers. This analytical solution was possible at least partially because of the hybrid method of modeling with linear and non-linear terms. The solution time can also vary depending on placing additional constraints on cycle time and boundary space. In addition, the proposed approach was demonstrated on real-time data for one signal cycle for the first corridor at 5:30 pm to determine the signal timing plan for next cycle. To measure the impact of the proposed solution, the optimal signal timing plan may be incorporated into either simulated signal controllers in a simulation environment or real signal controllers and continue with closed loop control.

In view of the forgoing, the present solution concerns a novel hybrid modeling method for traffic delay prediction suitable for real-time implementation to eliminate drawbacks of current ML-based methods for signalized intersections. The novel hybrid modeling method is configured to capture both linear and nonlinear stochastic characteristics of multiple traffic features (e.g., traffic signal timings, traffic volume, travel delays, etc.), and to be computationally efficient for real-time implementation. The novel hybrid modeling method was validated by developing MIMO neural network based models for multiple intersections along an arterial in Hawaii with event based data extracted from the Econolite systems. Also, a sample control plan was generated for one signal cycle to demonstrate the effectiveness and advantage of the proposed approach. During actual implementation, this signal timing plan may be iteratively generated and fed to the field signal controller using a closed loop feedback system configured for all the intersections.

The overall MAPE in delay prediction for all the intersections was shown to be less than 10%. These results represent evening peak hours traffic data (4 pm-7 pm), but similar performance is expected for other times of the day. As mentioned earlier, the present solution concerns a modeling methodology to predict the one-step-ahead delay given the raw traffic data. An effective use case of this approach can be fully understood during the implementation phase by utilizing the closed loop control strategy. Since the control variable of interest is in a linear form, the prediction model can be easily implemented to achieve a real-time closed loop control system that uses traffic flow state as feedback to control signal timing 24/7 intelligently along a multi-intersection corridor.

Figure 20:
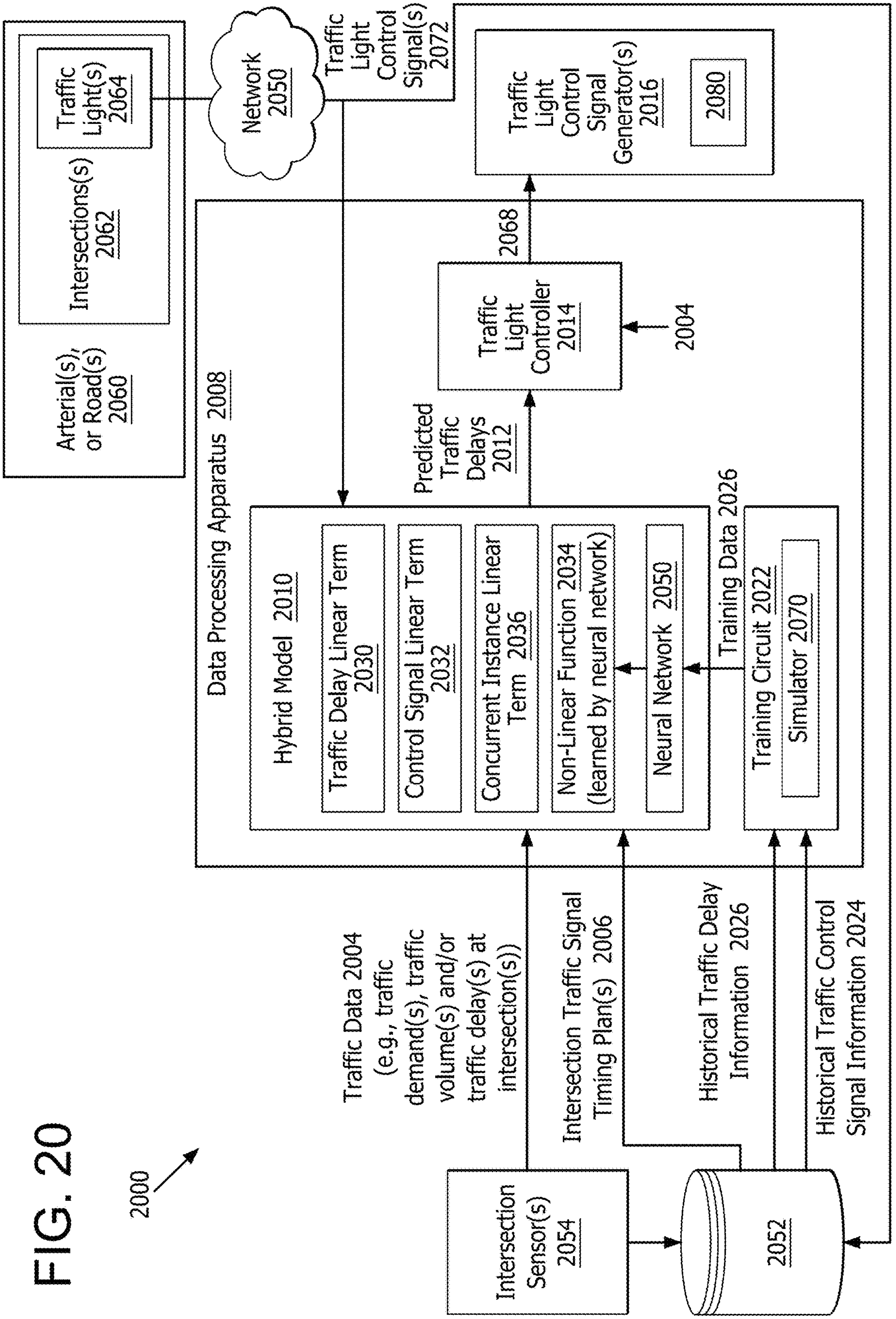
FIG. 20 provides an illustration of a system implementing the present solution.

FIG. 20 provides an illustration of a traffic control system 2000 implementing the hybrid modeling method to facilitate control of traffic flow along arterials or roads 2060. System 2000 is configured to achieve smoother traffic flow with minimized delay and energy consumption as compared to conventional traffic control systems.

System 2000 comprises a data processing apparatus 2008 implementing a hybrid model 2010. The data processing apparatus 2008 can include a processor and/or a computing device. Hybrid model 2010 is a combination of a linear model and a non-linear model. The linear model is defined by a traffic delay linear term 2030, a control signal linear term 2032, and/or a concurrent instance linear term 2036. The traffic delay linear term 2030 is defined by an instance of traffic delays y(t) and an estimated parameter A learned by and output from a trained neural network 2050. The control signal linear term 2032 is defined by a concurrent instance of the traffic light control signals u(t) and an estimated parameter B learned by and output from the trained neural network 2050. The concurrent instance linear term 2036 is defined by a concurrent instance of the traffic volume v(t) and an estimated parameter C learned by and output from the trained neural network 2050. The non-linear model is defined by a non-linear function 2034 which is learned by and output from the trained neural network 2050. The non-linear function 2034 is at least partially defined by the instance of the traffic delays y(t) and a previous instance of the traffic light control signals u(t−1). The output of the hybrid model 2010 comprises predicted traffic delays 2012, which are communicated to a traffic light controller 2014.

In some scenarios, the hybrid model 2010 is defined by mathematical equation (2) which was provided above and reproduced below. Here, k has been replaced with t. y(t+1) represents the predicted traffic delays 2012 in FIG. 20.

$$y(t+1)=Ay(t)+Bu(t)+f(y(t), u(t-1), v(t))$$

where y(t) denotes an average delay per vehicle, u(t) denotes a green light time for multiple intersections at time index t, $f(\ldots)$ is a nonlinear vector function that is learned by the neural network 2050, u(t−1) denotes a green light time for multiple intersections at time index t−1, and v(t) represents noise. A and B represent weight matrices that are learned by the neural network 2050 simultaneously with the learning of the nonlinear vector function $f(\ldots)$. The present solution is not limited to this definition of the hybrid model.

In other scenarios, the hybrid model 2010 is defined by mathematical equation (26) which was provided above and reproduced below. y(t+1) represents the predicted traffic delays 2012 in FIG. 20.

$$y(t+1)=Ay(t)+Bu(t)+Cv(t)+F(y(t),u(t-1),v(t);\pi)+\epsilon(t+1)$$

where y(t) represents a delay per vehicle at time t, u(t) represents a green light at time t, u(t−1) represents a green light at time t−1, v(t) represents a vehicle volume at time t, F represents a nonlinear function learned by the neural network 2050, E(t+1) represents a model error at time t+1, and r represents a grouping of all neural network weights and biases. A, B and C represent weight matrices that are learned by the neural network 2050 simultaneously with the learning of the nonlinear vector function $f(\ldots)$. The present solution is not limited to this definition of the hybrid model.

In other scenarios, the hybrid model 2010 is defined by mathematical equation (27) which was provided above and reproduced below. y(t+1) represents the predicted traffic delays 2012 in FIG. 20.

$$y(t+1)=Ay(t)+Bu(t)+F(y(t),u(t-1),v(t);\pi)+\epsilon(t+1)$$

where y(t) represents a delay per vehicle at time t, u(t) represents a green light time for multiple intersections at time index t, u(t−1) represents a green light at time t−1, v(t) represents a vehicle volume at time t, F represents a nonlinear function learned by the neural network 2050, E(t+1) represents a model error at time t+1, and n represents a grouping of all neural network weights and biases. A and B represent weight matrices that are learned by the neural network 2050 simultaneously with the learning of the nonlinear vector function $f(\ldots)$. The present solution is not limited to this definition of the hybrid model.

The neural network 2050 is trained using training data 2026 for predicting traffic delays. The neural network may be re-trained continuously or periodically. As such, the non-linear function F, weight matrices A, B, C and/or weights/biases grouping $\pi$ may change overtime.

The training data 2026 is generated by a training circuit 2022. The training circuit 2022 is configured to access a datastore 2052 to obtain historical traffic delay information 2026 and historical traffic control signal information 2024. The historical traffic delay information 2026 includes, but is not limited to, data relating to traffic demand(s) for intersection(s) 2062 at different times, data relating to traffic volume(s) for intersection(s) 2062 at different times, and/or data relating to vehicle delay(s) for intersection(s) 2062 at different times. The historical traffic control signal information 2024 includes, but is not limited to, data relating to traffic control signals for controlling traffic lights 2064 at different times. The traffic lights 2062 are disposed at intersections 2062 of arterial(s) or road(s) 2060. The historical information 2024 and 2026 is used as training data 2026 for the neural network 2050, by the training circuit 2022 to generate training data 2026 for the neural network 2050, and/or as inputs to a simulator 2070.

Simulator 2070 is configured to simulation operations and events in a simulated environment of arterial(s) or road(s) comprising intersection(s) and traffic light(s). The simulator 2070 may generate traffic control signals and determine associated traffic delays by simulating traffic through the intersection(s) of the arterial(s). The traffic control signals and/or traffic delays may be output from the simulator 2070 and included in the training data 2026.

The neural network 2050 may implement Artificial Intelligence (AI) that provides a data processing and/or computing device with the ability to automatically learn and improve data analytics from experience without being explicitly programmed. Neural network 2050 may reside on data processing apparatus 2008 and/or on another device. The neural network 2050 employ(s) one or more machine learning algorithms that learn various information from the training data 2026 (e.g., via pattern recognition and prediction making). Machine learning algorithms are well known in the art. For example, in some scenarios, the neural network 2050 employs a supervised learning algorithm, an unsupervised learning algorithm, and/or a semi-supervised algorithm. The learning algorithm(s) is(are) used to model traffic light control decisions based on data analysis (e.g., captured intersection sensor information, traffic signal timing plans, traffic control signals, and other information). Neural network 2050 may be a recursive neural network.

Once the neural network 2050 is trained, various information is input into the neural network 2050 to cause generation of the non-linear function 2034 and weight matrices A, B and/or C. The information input into the neural network includes, but is not limited to, traffic data 2004, intersection traffic control plan(s) 2006, and/or traffic light control signal(s) 2072. The traffic data 2004 can include intersection information captured by intersection sensor(s) 2054. The intersection traffic control plan(s) may include a signal timing plan that provides the duration of green, yellow, and red lights in a fixed cycle length. The intersection sensor(s) 2054 can include, but is(are) not limited to, camera(s), other imaging device(s), radar system(s), lidar system(s), microphone(s), other noise detection device(s), proximity sensor(s), vibration sensor(s), and/or wireless communication device(s) (e.g., radio frequency communication devices). The listed types of sensors are known in the field. Any known or to be known sensor of the listed types can be used here.

During operation, the data processing apparatus 2008 monitors the traffic light control signals 2072 that are used to operate the traffic lights 2064, monitors traffic delays at the intersection(s) 2062 that are associated with the monitored traffic light control signals 2072, and/or monitors traffic volume associated with the traffic light control signals 2072 and the associated traffic delays. In this regard, the data processing apparatus 2008 is configured to receive or otherwise obtain traffic data 2004 from intersection sensor(s) 2054, intersection traffic signal timing plan(s) 2006 from datastore 2052, and/or traffic light control signal(s) 2072 from a traffic light control signal generator 2016.

The data processing apparatus 2008 accesses and uses the hybrid model 2010 to make predictions about traffic delays at the intersection(s) 2062 of the arterial(s) 2062 based on the monitored information 2004 and 2072. For example, the data processing apparatus 2008 may predict traffic delays by applying the hybrid model 2010 to the monitored traffic light control signals 2072 and traffic data 2004 specifying the monitored traffic delays and/or monitored traffic volume.

The predicted traffic delays 2012 are provided to a traffic light controller 2014. The traffic light controller 2014 is configured to determine traffic control signals which cause (1) the predicted traffic delays 2012 to decrease based on the traffic data 2004 and/or (2) fuel consumption associated with the traffic flow along the arterial(s) 2060 to decrease. Any known or to be known method for determining or predicting fuel consumption of vehicle(s) traveling on road(s) may be used here. The determined traffic control signals 2068 are then communicated to the traffic light control signal generator 2016 along with instructions to use the same for controlling operations of the traffic light(s) 2064.

The traffic light control signal generator(s) 2016 can include one or more controller module(s) 2080 configured to facilitate the control of traffic flow along the arterial(s) 2060. The controller module(s) 2080 may be located remote from, located in proximity to, or collocated at the respective traffic light(s) 2064, intersection(s) 2062, and/or arterial(s) 2060. Each controller module may be configured to control, based on traffic control signals issued by the traffic light control signal generator 2016, a respective subset of traffic lights at the corresponding intersection. The traffic light control signals 2072 may be communicated from the traffic light control signal generator(s) 2016 over a network 2050 to the traffic light(s) 2064. Network 2050 can include, but is not limited to, the Internet, a wireless communication network (e.g., a radio frequency network, or a cellular network), a wired communication network (e.g., an ethernet network) and/or other type of network.

Figure 21:
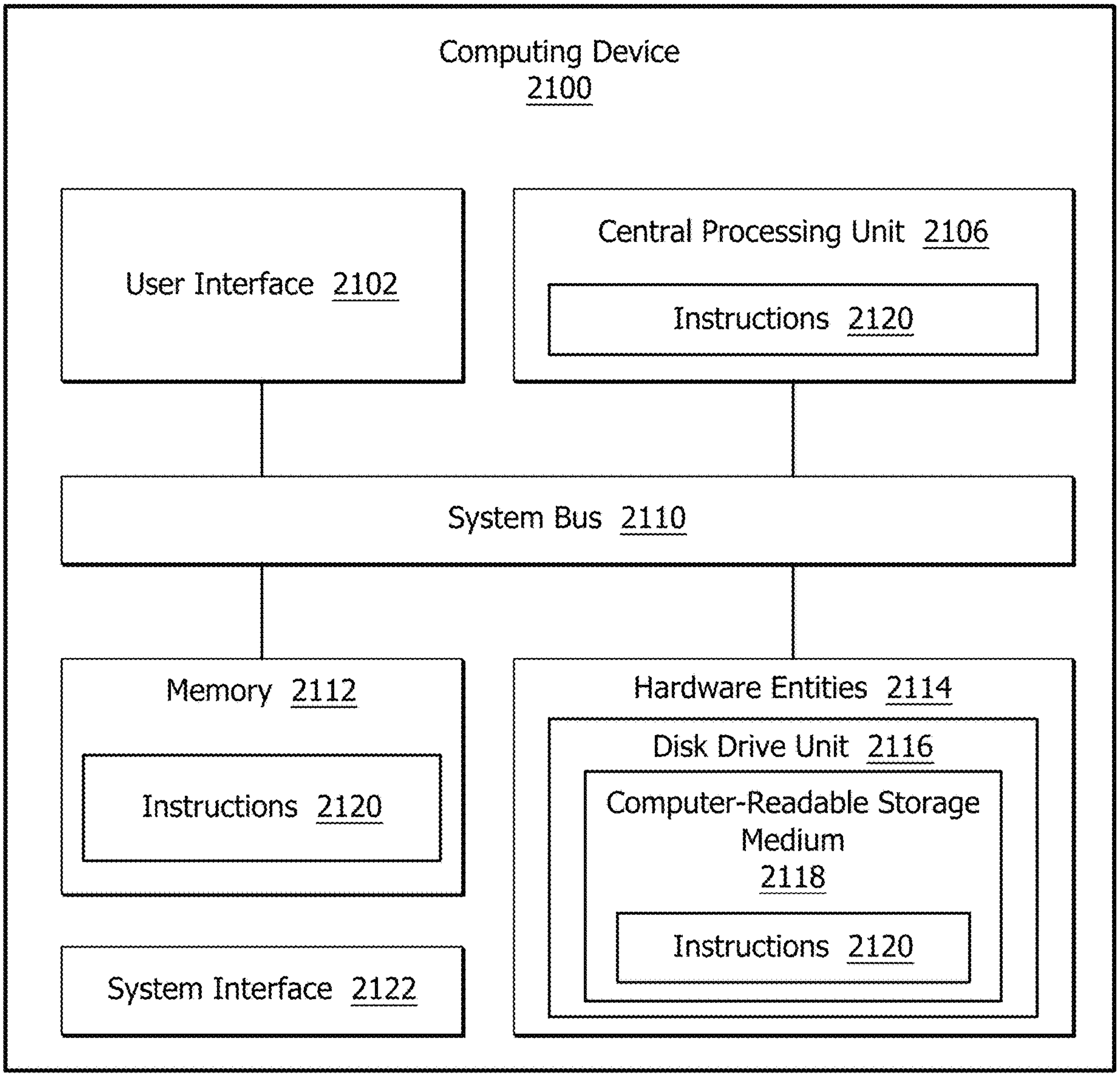
FIG. 21 provides an illustration of a data processing apparatus.

Referring now to FIG. 21, there is provided a block diagram of an illustrative embodiment of a computing device 2100. Data processing apparatus 2008 of FIG. 2008 can be the same as or similar to computing device 2100. As such, the discussion of computing device 2100 is sufficient for understanding data processing apparatus 2008.

Computing device 2100 can include, but is not limited to, a notebook, a desktop computer, a laptop computer, a personal digital assistant, and a tablet PC. Some or all the components of the computing device 2100 can be implemented as hardware, software and/or a combination of hardware and software. The hardware includes, but is not limited to, one or more electronic circuits.

Computing device 2100 may include more or less components than those shown in FIG. 21. However, the components shown are sufficient to disclose an illustrative embodiment implementing the present invention. The hardware architecture of FIG. 21 represents one embodiment of a representative computing device configured to facilitate control of traffic flow along arterials in an efficient manner. As such, the computing device 2100 of FIG. 21 implements improved methods for controlling traffic flow along arterials in accordance with embodiments of the present solution.

As shown in FIG. 21, computing device 2100 includes a system interface 2122, a user interface 2102, a central processing unit (CPU) 2106, a system bus 2110, a memory 2112 connected to and accessible by other portions of computing device 2100 through system bus 2110, and hardware entities 2114 connected to system bus 2110. At least some of the hardware entities 2114 perform actions involving access to and use of memory 2112, which can be a random access memory (RAM), a disk driver and/or a compact disc read only memory (CD-ROM).

System interface 2122 allows the computing device 2100 to communicate directly or indirectly with external communication devices (e.g., sensor(s) 2000 of FIG. 20). If the computing device 2100 is communicating indirectly with the external communication device, then the computing device 2100 is sending and receiving communications through a common network (e.g., the Internet or Intranet).

Hardware entities 2114 can include a disk drive unit 2116 comprising a computer-readable storage medium 2118 on which is stored one or more sets of instructions 2120 (e.g., software code) configured to implement one or more of the methodologies, procedures, or functions described herein. The instructions 2120 can also reside, completely or at least partially, within the memory 2112 and/or within the CPU 2106 during execution thereof by the computing device 2100. The memory 2112 and the CPU 2106 also can constitute machine-readable media. The term "machine-readable media", as used here, refers to a single medium or multiple media (e.g., a centralized or distributed database, and/or associated caches and servers) that store the one or more sets of instructions 2120. The term "machine-readable media", as used here, also refers to any medium that is capable of storing, encoding or carrying a set of instructions 2120 for execution by the computing device 2100 and that cause the computing device 2100 to perform any one or more of the methodologies of the present disclosure.

In view of the forgoing, the present solution concerns implementing systems (e.g., system 2000 of FIG. 20) and methods for controlling traffic flow along arterial(s) (e.g. arterial(s) 2060 of FIG. 20). The systems comprise a training circuit (e.g., training circuit 2022 of FIG. 20), a data processing apparatus (e.g., data processing apparatus 2008), a computing device (e.g., computing device 2100 of FIG. 21), and/or traffic control signal generator(s) (e.g., traffic light control signal generator(s) 2016 of FIG. 20).

The training circuit is configured to: (i) obtain information relating to traffic control signals (e.g., historical information 2024 and/or traffic light control signal(s) 2072 of FIG. 20) used to control traffic lights (e.g., traffic light(s) 2064 of FIG. 20) disposed at intersection(s) (e.g., intersection(s) 2062 of FIG. 20) of the arterials, (ii) obtain information (e.g., historical information 2026 and/or traffic data 2004 of FIG. 20) relating to traffic delays associated with the traffic control signals; and (iii) train, based on the obtained information obtained in (i) and (ii), a hybrid model (e.g. hybrid model 2010 of FIG. 20) for predicting traffic delays. The hybrid model comprises at least: a first linear term (e.g., $Ay(t)$) corresponding to an instance of the traffic delays (e.g., $y(t)$); a second linear term $Bu(t)$ corresponding to a concurrent instance of the traffic light control signals (e.g., $u(t)$); and/or a nonlinear term (e.g., $F$) being learned by a neural network (e.g., neural network 2050 of FIG. 20) and corresponding to the instance of the traffic delays (e.g., $y(t)$) and a previous instance of the traffic light control signals (e.g., $u(t-1)$).

The data processing apparatus is communicatively coupled to traffic control signal generator(s) of the system. The data processing apparatus is configured to: (i) monitor the traffic light control signals (e.g., traffic light control signal(s) 2072 of FIG. 20) used to operate the traffic light(s); (ii) monitor traffic delay(s) associated with the monitored traffic control signal(s); (iii) access the trained hybrid model; (iv) generate predicted traffic delays (e.g., predicted traffic delays 2012 of FIG. 20) by applying the trained hybrid model to the monitored traffic control signals and the monitored traffic delays; (v) determine, based on the monitored traffic control signals and associated traffic delays, traffic control signals (e.g., traffic control signal(s) 2068 of FIG. 20) that cause the predicted traffic delays to decrease; and (vi) instruct the traffic control signal generator(s) to control the corresponding traffic lights using the determined traffic control signals. The data processing apparatus may also be configured to determine the traffic control signals that further cause fuel consumption associated with the traffic flow along the arterials to decrease.

The training circuit may also be configured to obtain information (e.g., traffic data 2004 of FIG. 20) relating to traffic volume through the intersection(s) of the arterial(s). In this case, the hybrid model may comprise a third linear term (e.g., Cv(t)) corresponding to a concurrent instance of the traffic volume (e.g., v(t)). The nonlinear term (e.g., F) may further corresponds to the concurrent instance of the traffic volume. The data processing apparatus may be configured to further: monitor traffic volume associated with the monitored traffic control signals and the associated traffic delays; predict traffic delays by applying the trained model to the monitored traffic control signals, the monitored traffic delays, and the monitored traffic volume; and determine the traffic control signals based also on the monitored traffic volume.

The system may comprise a road infrastructure system: traffic lights disposed at corresponding intersections along arterials; and traffic control signal generator(s) or controller modules collocated at respective intersections. Each traffic control signal generator(s) or controller modules may be configured to control, based on traffic control signals issued by the traffic-flow controlling system, a respective subset of traffic lights at the corresponding intersection.

Figure 22:
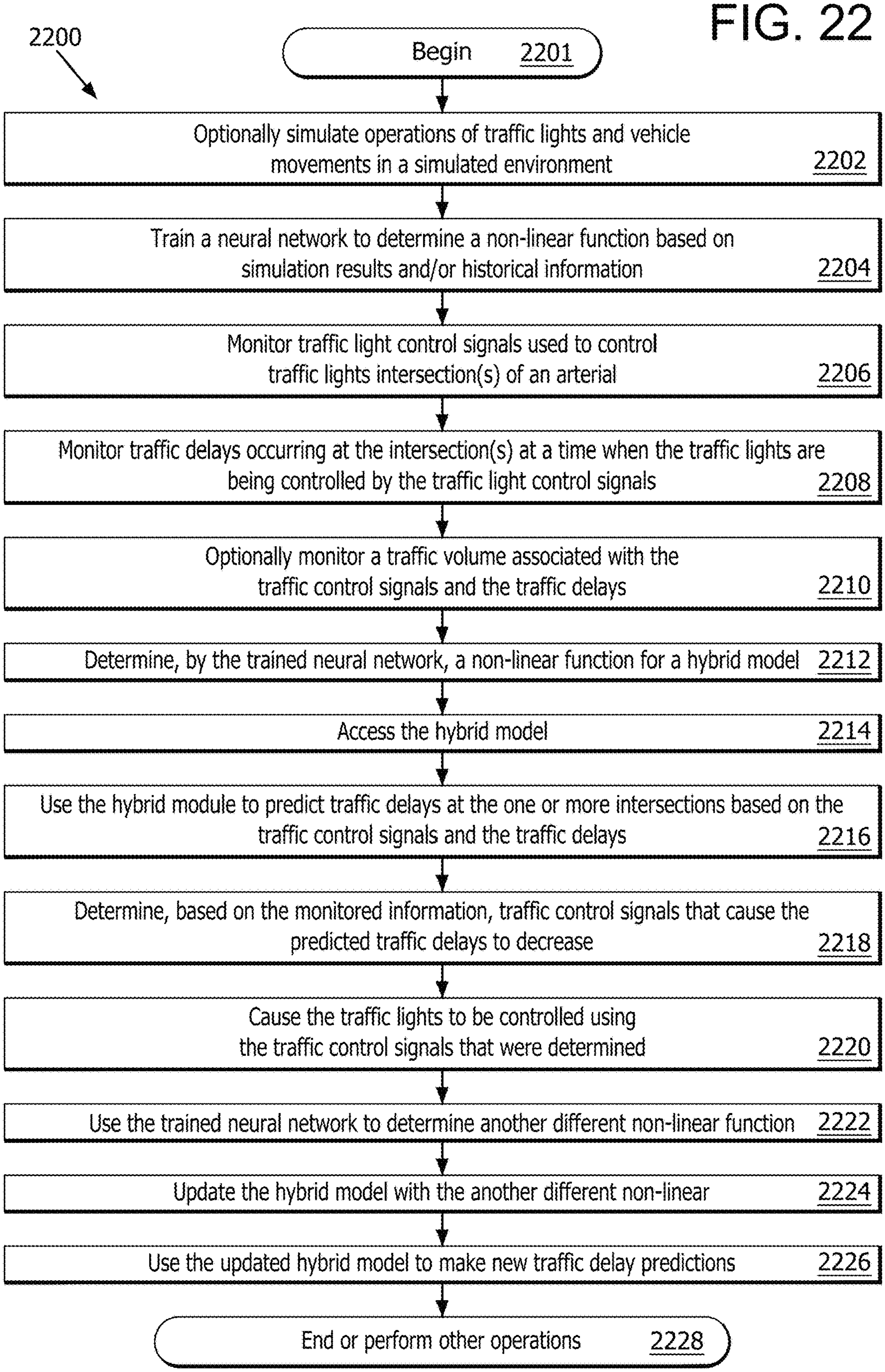
FIG. 22 provides an illustration of a method for controlling traffic flow along an arterial.

FIG. 22 provides a flow diagram of an illustrative method 2200 for controlling traffic flow along an arterial (e.g., arterial 2060 of FIG. 20). Method 2200 begins with 2201 and continues to 2202 where a data processing apparatus (e.g., data processing apparatus 2008 of FIG. 20) optionally simulates operations of traffic lights and vehicle movements in a simulated environment. Any known or to be known simulation technique can be used here.

A neural network (e.g., neural network 2050 of FIG. 20) is trained in 2204 to determine a non-linear function (e.g., non-linear function 2034 of FIG. 20) based on the simulation results and/or historical information (e.g., historical information 2024 and/or 2026 of FIG. 20). Any known or to be known technique for training a neural network based on training data can be used here. The historical information can include, but is not limited to, historical traffic control signal information associated with one or more intersections of the arterial and historical traffic delay information associated with traffic control signals used to control traffic lights at the one or more intersections. The inputs to the neural network can include, but are not limited to, traffic light control signals and the traffic delays. The neural network may be trained to detect pattern(s) in the inputted information with specify or otherwise indicate a non-linear relationship(s) between two or more variables, and derive or otherwise generate a non-linear function based on the detected pattern(s) and/or nonlinear relationship(s). The non-linear relationship between two variable is one for which the slope of a curve changes as the value of one variable changes. The non-linear function may define or specifies a nonlinear relationship between the instance of the traffic delays and a previous instance of the traffic light control signals. The nonlinear function may additionally or alternatively define a relationship between a set of inputs and an output, the set of inputs comprising an average delay per vehicle at a time t, and a green light time for the one or more intersections at time index t−1. The non-linear function can include, but is not limited to, a quadratic function, a polynomial function, a logarithmic function, or an exponential function. For example, the non-linear function could be $f(y(t), u(t-1), v(t))=y(t)^3+u(t-1)^2+v(t)$. The present solution is not limited in this regard.

In 2206-2208, the data processing apparatus performs operations to (i) monitor traffic light control signals (e.g., traffic light control signal(s) 2072 of FIG. 20) used to control traffic lights (e.g., traffic light(s) 2064 of FIG. 20) at one or more intersections (e.g., intersection(s) 2062 of FIG. 20) of the arterial and (ii) monitor traffic delays occurring at the one or more intersections at a time when the traffic lights are being controlled by the traffic light control signals. The data processing apparatus may also monitor a traffic volume associated with the traffic control signals and the traffic delays, as shown by block 2010. The monitoring operations can involve, for example, receiving sensor data from sensor(s) (e.g., intersection sensor(s) 2054 of FIG. 20), obtaining intersection traffic signal timing plan(s) (e.g., intersection traffic signal timing plan(s) 2006 of FIG. 20) from a datastore (e.g., datastore 2052 of FIG. 20), and/or processing the sensor data to detect event(s) and/or pattern(s) therein.

In 2012, the data processing apparatus uses the neural network to determine a non-linear function (e.g., non-linear function 2034 of FIG. 20) for a hybrid model (e.g., hybrid model 2010 of FIG. 20). The inputs to the trained neural network can include, but are not limited to, the information monitored in blocks 2206, 2208 and/or 2210. The non-linear function defines or specifies a nonlinear relationship between the instance of the traffic delays and a previous instance of the traffic light control signals. The hybrid model is updated to include the non-linear function determined by the neural network. The hybrid model also comprises a first linear term (e.g., the traffic delay linear term 2030 of FIG. 20) corresponding to an instance of the traffic delays, and a second linear term (e.g., control signal linear term 2032 of FIG. 20) corresponding to a concurrent instance of the traffic light control signals. The neural network can include, but is not limited to, a recursive neural network.

In block 2214, the data processing apparatus accesses the hybrid model. The data processing apparatus uses the hybrid module in block 2216 to predict traffic delays at the intersection(s) based on the traffic control signals, traffic delays and/or traffic volume(s).

The hybrid model may be defined by mathematical equation $y(t+1)=Ay(t)+Bu(t)+f(y(t), u(t-1), v(t))$, where y(t+1) represents the predicted traffic delays, Ay(t) represents the first linear term, Bu(t) the second linear term, $f( \ldots )$ represents the non-linear function determined by a neural network, y(t) denotes an average delay per vehicle, u(t) denotes a green light time for the one or more intersections at time index t, u(t−1) denotes a green light time for the one or more intersections at time index t−1, v(t) represents noise, and A and B represent weight matrices that are learned by the neural network simultaneously with the learning of the nonlinear function.

The hybrid module may comprise a third linear term corresponding to a concurrent instance of the traffic light control signals. In this case, the hybrid module may be defined by mathematical equation $y(t+1)=Ay(t)+Bu(t)+Cv(t)+F(y(t), u(t-1), v(t); \pi)+c(t+1)$, wherein y(t+1) represents the predicted traffic delays, Ay(t) represents the first linear term, Bu(t) the second linear term, Cv(t) represents the third linear term, $F( \ldots )$ represents that non-linear function learned by a neural network, y(t) represents a delay per vehicle at time t, u(t) represents a green light at time t, u(t−1) represents a green light at time t−1, v(t) represents a vehicle volume at time t, c(t+1) represents a model error at time t+1, π represents a grouping of neural network weights and biases, and A, B and C represent weight matrices that are learned by the neural network simultaneously with the learning of the nonlinear vector function.

Alternatively, the hybrid module may be defined by mathematical equation y(t+1)=Ay(t)+Bu(t)+F(y(t), u(t−1), v(t); π)+c(t+1), where y(t+1) represents the predicted traffic delays, Ay(t) represents the first linear term, Bu(t) represents the second linear term, v(t) represents the third linear term comprising a vehicle volume at time t, F( . . . ) represents that non-linear function learned by a neural network, y(t) represents a delay per vehicle at time t, u(t) represents a green light time for the one or more intersections at time index t, u(t−1) represents a green light at time t−1, c(t+1) represents a model error at time t+1, π represents a grouping of neural network weights and biases, and A and B represent weight matrices that are learned by the neural network simultaneously with the learning of the nonlinear vector function.

In 2218, the data processing apparatus determines, based on the monitored information of block 2206, 2208 and/or 2210 (e.g., traffic light control signals, the traffic delays and/or traffic volume), traffic control signals (e.g., traffic control signal(s) 2068 of FIG. 20) that cause the predicted traffic delays to decrease. This determination can be made using green traffic light timing associated with the monitored traffic light control signals. This control delay minimization is governed and implemented by mathematical equation (3), which particularly formulates the overall control objective function to minimize predicted control delay and ground-truth control delay. Through the proposal HNN model in mathematical equation (4), and its solution procedure denoted by mathematical equations (5)-(10), corresponding optimal green timing settings can be determined, therefore, resulting in control delay minimization.

In 2220, the data processing apparatus performs operations to cause the traffic lights to be controlled using the traffic control signals that were determined in block 2218. The operations can include, but are not limited to, communicating the traffic control signal(s) to a circuit (e.g., traffic light control signal generator(s) 2016 of FIG. 20)) along with instructions to control the traffic lights in accordance therewith. The circuit is configured to control the traffic lights using the traffic control signals that were determined by the data processing apparatus. In this regard, the circuit may generate traffic light control signals for the traffic lights and use the traffic light control signals to control operations of the traffic lights. Any known or to be known techniques for generating traffic light control signals and controlling traffic lights using the same can be employed herein.

In 2222-2226, the data processing apparatus uses the trained neural network to determine another different non-linear function, updates the hybrid model by replacing the non-linear function with the other different non-linear, and uses the updated hybrid model to make new predictions about traffic delays at the one or more intersections. For example, the hybrid model may be updated to replace mathematical equation (2) with mathematical equation (26) or (27), replace mathematical equation (26) with mathematical equation (2) or (27), or replace mathematical equation (27) with mathematical equation (2) or (26). Mathematical equations (2), (26) or (27) can be replaced with another mathematical equation. The present solution is not limited to the particulars of this example. Subsequently, method 2200 continues to block 2228 where it ends or other operations are performed.

The terms "processor" and "processing device" refer to a hardware component of an electronic device that is configured to execute programming instructions. Except where specifically stated otherwise, the singular terms "processor" and "processing device" are intended to include both single-processing device embodiments and embodiments in which multiple processing devices together or collectively perform a process.

The terms "memory," "memory device," "computer-readable medium," "data store," "data storage facility" and the like each refer to a non-transitory device on which computer-readable data, programming instructions or both are stored. Except where specifically stated otherwise, the terms "memory," "memory device," "computer-readable medium," "data store," "data storage facility" and the like are intended to include single device embodiments, embodiments in which multiple memory devices together or collectively store a set of data or instructions, as well as individual sectors within such devices. A computer program product is a memory device with programming instructions stored on it.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

The described features, advantages and characteristics disclosed herein may be combined in any suitable manner. One skilled in the relevant art will recognize, in light of the description herein, that the disclosed systems and/or methods can be practiced without one or more of the specific features. In other instances, additional features and advantages may be recognized in certain scenarios that may not be present in all instances.

Although the systems and methods have been illustrated and described with respect to one or more implementations, equivalent alterations and modifications will occur to others skilled in the art upon the reading and understanding of this specification and the annexed drawings. In addition, while a particular feature may have been disclosed with respect to only one of several implementations, such feature may be combined with one or more other features of the other implementations as may be desired and advantageous for any given or particular application. Thus, the breadth and scope of the disclosure herein should not be limited by any of the above descriptions. Rather, the scope of the invention should be defined in accordance with the following claims and their equivalents.

What is claimed is:

1. A system for controlling traffic flow along an arterial, comprising:

a data processing apparatus configured to:

monitor traffic light control signals used to control traffic lights at one or more intersections of the arterial and traffic delays occurring at the one or more intersections at a time when the intersections are being controlled by the traffic lights;

access a hybrid model comprising a first linear term corresponding to an instance of the traffic delays, a second linear term corresponding to a concurrent instance of the traffic light control signals, and a nonlinear function defining a nonlinear relationship between the instance of the traffic delays and a previous instance of the traffic light control signals;

use the hybrid model to predict traffic delays at the one or more intersections based on the traffic control signals and the traffic delays;

determine, based on the current traffic light control signals and the traffic delays, traffic control signals that cause the predicted traffic delays to decrease; and cause the traffic lights to be controlled using the traffic control signals that were determined.

2. The system according to claim 1, further comprising a circuit configured to control the traffic lights using the traffic control signals that were determined by the data processing apparatus.

3. The system according to claim 1, wherein the data processing apparatus is further configured to train a neural network to determine the non-linear function based on historical traffic control signal information associated with one or more intersections of the arterial and historical traffic delay information associated with traffic control signals used to control traffic lights at the one or more intersections.

4. The system according to claim 3, wherein the data processing apparatus is further configured to use the traffic light control signals and the traffic delays as inputs to the trained neural network for determining the non-linear function of the hybrid model.

5. The system according to claim 4, wherein the data processing apparatus is further configured to use the trained neural network to determine another different non-linear function, update the hybrid model by replacing the non-linear function with the another different non-linear, and use the updated hybrid model to make new predictions about traffic delays at the one or more intersections.

6. The system according to claim 3, wherein the neural network is a recursive neural network.

7. The system according to claim 3, wherein:

the data processing apparatus is further configured to simulate operations of the traffic lights and vehicle movements in a simulated environment to obtain traffic delays associated with simulated traffic light control signals; and the neural network is trained further based on the simulated traffic light control signals and the traffic delays associated with the simulated traffic light control signals.

8. The system according to claim 1, wherein the nonlinear function defines a relationship between a set of inputs and an output, the set of inputs comprising an average delay per vehicle at a time t, and a green light time for the one or more intersections at time index t−1.

9. The system according to claim 1, wherein the hybrid model is defined by mathematical equation $y(t+1)=Ay(t)+Bu(t)+f(y(t), u(t-1), v(t))$, where $y(t+1)$ represents the predicted traffic delays, $Ay(t)$ represents the first linear term, $Bu(t)$ the second linear term, $f( \ldots )$ represents the non-linear function determined by a neural network, $y(t)$ denotes an average delay per vehicle, $u(t)$ denotes a green light time for the one or more intersections at time index t, $u(t-1)$ denotes a green light time for the one or more intersections at time index t−1, $v(t)$ represents noise, and A and B represent weight matrices that are learned by the neural network simultaneously with the learning of the nonlinear function.

10. The system according to claim 1, wherein the hybrid model further comprises a third linear term corresponding to a concurrent instance of the traffic light control signals.

11. The system according to claim 10, wherein the hybrid model is defined by mathematical equation $y(t+1)=Ay(t)+Bu(t)+Cv(t)+F(y(t), u(t-1), v(t); \pi)+\epsilon(t+1)$, wherein $y(t+1)$ represents the predicted traffic delays, $Ay(t)$ represents the first linear term, $Bu(t)$ the second linear term, $Cv(t)$ represents the third linear term, $F( \ldots )$ represents that non-linear function learned by a neural network, $y(t)$ represents a delay per vehicle at time t, $u(t)$ represents a green light at time t, $u(t-1)$ represents a green light at time t−1, $v(t)$ represents a vehicle volume at time t, $\epsilon(t+1)$ represents a model error at time t+1, $\pi$ represents a grouping of neural network weights and biases, and A, B and C represent weight matrices that are learned by the neural network simultaneously with the learning of the nonlinear vector function.

12. The system according to claim 1, wherein:

the data processing apparatus is further configured to monitor a traffic volume associated with the traffic control signals and the traffic delays;

the traffic delays are predicted by the hybrid model further based on the traffic volume; and the traffic control signals are determined based further on the traffic volume.

13. A non-transitory computer-readable medium that stores instructions that is configured to, when executed by at least one computing device, cause the at least one computing device to perform operations comprising:

monitoring traffic light control signals used to control traffic lights at one or more intersections of the arterial and traffic delays occurring at the one or more intersections at a time when the traffic lights are being controlled by the traffic light control signals;

accessing a hybrid model comprising a first linear term corresponding to an instance of the traffic delays, a second linear term corresponding to a concurrent instance of the traffic light control signals, and a nonlinear function defining a nonlinear relationship between the instance of the traffic delays and a previous instance of the traffic light control signals;

using the hybrid model to predict traffic delays at the one or more intersections based on the traffic control signals and the traffic delays;

determining, based on the traffic light control signals and the traffic delays, traffic control signals that cause the predicted traffic delays to decrease; and causing the traffic lights to be controlled using the traffic control signals that were determined.

14. The non-transitory computer-readable medium according to claim 13, wherein the at least one computing device is further caused to train a neural network to determine a non-linear function based on historical traffic control signal information associated with one or more intersections of the arterial and historical traffic delay information associated with traffic control signals used to control traffic lights at the one or more intersections.

15. The non-transitory computer-readable medium according to claim 14, wherein the at least one computing device is further caused to use the traffic light control signals and the traffic delays as inputs to the trained neural network for determining the non-linear function of the hybrid model.

16. The non-transitory computer-readable medium according to claim 14, wherein the at least one computing device is further caused to simulate operations of the traffic lights and vehicle movements in a simulated environment to obtain traffic delays associated with simulated traffic light control signals, and the hybrid model is trained further based on the simulated traffic light control signals and the traffic delays associated with the simulated traffic light control signals.

17. The non-transitory computer-readable medium according to claim 13, wherein the nonlinear function defines a relationship between a set of inputs and an output, the set of inputs comprising an average delay per vehicle at a time t, and a green light time for the one or more intersections at time index t−1.

18. The non-transitory computer-readable medium according to claim 13, wherein the hybrid model further comprises a third linear term corresponding to a concurrent instance of the traffic light control signals.

19. The non-transitory computer-readable medium according to claim 13, wherein the at least one computing device is further caused to monitor a traffic volume associated with the traffic control signals and the traffic delays, and the traffic delays are predicted by the hybrid model further based on the traffic volume, and the traffic control signals are determined based further on the traffic volume.

* * * * *